US007835973B2

(12) United States Patent
Shields et al.

(10) Patent No.: US 7,835,973 B2
(45) Date of Patent: Nov. 16, 2010

(54) SPOT MARKET CLEARING

(75) Inventors: Francis X. Shields, Media, PA (US);
Todd W. Bessemer, Wynnewood, PA
(US); Mark A. Ruane, Houston, TX
(US)

(73) Assignee: Accenture Global Services Limited,
Dublin (IE)

( * ) Notice: Subject to any disclaimer, the term of this patent is extended or adjusted under 35 U.S.C. 154(b) by 1272 days.

(21) Appl. No.: 10/787,529

(22) Filed: Feb. 26, 2004

(65) Prior Publication Data

US 2005/0114255 A1 May 26, 2005

Related U.S. Application Data

(63) Continuation-in-part of application No. 09/421,713, filed on Oct. 20, 1999, now Pat. No. 7,085,739.

(60) Provisional application No. 60/525,038, filed on Nov. 24, 2003.

(51) Int. Cl.
*G06Q 40/00* (2006.01)
(52) U.S. Cl. ..................................... 705/37
(58) Field of Classification Search .............. 705/36–37
See application file for complete search history.

(56) References Cited

U.S. PATENT DOCUMENTS

| | | | |
|---|---|---|---|
| 6,450,407 B1 * | 9/2002 | Freeman et al. | 235/492 |
| 7,085,739 B1 * | 8/2006 | Winter et al. | 705/37 |
| 7,139,730 B1 * | 11/2006 | Shimko et al. | 705/35 |
| 2003/0061143 A1 | 3/2003 | Gustafson | |

OTHER PUBLICATIONS

Cal PX, Power Exchange Settlement and Billing Protocol (PSABP), May 2, 1998, <http://www.calpx.com> accessed via Internet Archives Wayback Machine <http://www.archive.org>.*
"Clearing arrangements for exchange-traded derivatives." CPSS Publications No. 23. Mar. 1997.*
United States General Accounting Office, "Payments, Clearance, and Settlement: A Guide to the Systems, Risks, and Issues." Jun. 1997, pp. 66-71.*
Frase, Dick and Parry, Helen, "Exchanges and Alternative Trading Systems", Sweet & Maxwell Limited, 2002, p. 99.*
"Cross-Margins for Equity Index and Interest Rate Futures and Options", Jul. 1999.*
Todd W. Bessemer, Keith B. Alyea, Francis X. Shields, "Taking Care of Risky Business: Credit Risk Management in Spot Markets," Accenture, 2002, 5 pages.

(Continued)

*Primary Examiner*—Stefanos Karmis
*Assistant Examiner*—Eric T Wong
(74) *Attorney, Agent, or Firm*—Brinks Hofer Gilson & Lione

(57) ABSTRACT

A spot market clearing house for clearing spot market trades. The spot market clearing house may receive data indicative of settlement for the spot market trades of a participant in a single spot market or in multiple spot markets. The data may include data indicative of initial settlement and data indicative of revised settlement amounts. The spot market clearing house may further determine performance bonds amounts based on daily exposures of the participant in the single spot market or multiple spot markets. The spot market clearing house may manage fund transfers to clear trades of the participant and to satisfy performance bond amounts.

30 Claims, 16 Drawing Sheets

OTHER PUBLICATIONS

Powernext User's Guide, "Everything you need to know to operate on Powernext," printed from the Internet at: http://www.powernext.fr/modules/Powernext/download/eng/User-guide_sep03.pdf, dated Version Sep. 2003, 54 pages.

Powernext Products and Organisation, printed from the Internet at: http://www.powernext.fr/modules/Powernext/download/eng/Uti_Brochure_publique_gb.pdf, dated Feb. 2004, 10 pages.

* cited by examiner

SPOT MARKET CLEARING

REFERENCE TO RELATED APPLICATIONS

This application is a continuation in part of U.S. patent application Ser. No. 09/421,713 filed Oct. 20, 1999 (now U.S. Pat. No. 7,085,739) and claims the benefit of U.S. Provisional Application No. 60/525,038, filed Nov. 24, 2003, which is hereby incorporated by reference in its entirety.

BACKGROUND OF THE INVENTION

A spot market market may comprise a market in which commodities are bought and sold for cash and delivered immediately. As shown in FIG. 1, the spot market may include real-time trading for same day delivery or day-ahead trading for delivery the following day. Examples of the commodities which may be bought or sold in a spot market include, for example, electricity, natural gas, grain, gold, crude oil, or RAM chips. In the electricity context, organized spot markets are an important component of most, if not all, competitive electricity markets. These markets may be facilitated by a Spot Market Operator (or Power Exchange), which is often combined with the Transmission System Operator in a single organization—referred to in the United States as a Regional Transmission Organization (RTO). There are several RTOs in different regions of the United States. Currently the RTO also acts as the central counter-party for many of the markets it facilitates, which means that it is the buyer to every seller and the seller to every buyer.

Referring to FIG. 2, there is shown a block diagram 200 of an electricity spot market. As discussed above, the RTO 210 may include Spot Market Operator 212 and System Operator 220. The Spot Market Operator 212 may include the functions of trade execution 214, settlement 216, and risk assessment 218. When trading, the Spot Market Operator 212 matches bids to buy electricity with offers to sell electricity. Participants 202 may send bids and offers to the Spot Market Operator 212. The bids and offers are comprised of a series of quantity and price pairs, monotonically increasing for offers (such as 50 MWh @ $35, 100 MWh @ $60, . . . ) and monotonically decreasing for bids.

Participants 202 may include those parties who trade in the wholesale electricity market. The traders may be broken into two general classes: (1) industry participants who are involved in the production and/or consumption of energy, generally using the forward market for the purpose of hedging financial risk; and (2) speculators who speculate upon or arbitrage the market price, with no intention, and often no capability, of taking delivery. In most cases, only the industry participants are involved in spot market trading, as these markets are intended to result in physical delivery. As shown in FIG. 2, examples of Participants 202 may include Wholesale Trading Businesses 204, Wholesale Production Businesses 206, and Wholesale Purchasing Businesses 208.

When trading, electricity spot markets transact via a multilateral auction in which supply offers (all sellers) and demand bids (all buyers) are matched in aggregate. Referring to FIG. 3, there is shown a graph, with two curves of quantity versus price, a supply curve and a demand curve. FIG. 3 illustrates the simple matching of supply and demand curves, based upon offers and bids respectively, in order to determine scheduled/dispatched quantity and marginal price. This figure is a simplification, showing how bids and offers would be matched in a system without physical constraints. In most markets this matching process is also subject to the constraints of network physics, and solved as an optimization problem.

As discussed above, the spot market may include a real-time market and/or a day-ahead hourly market. The real-time market balances supply and demand in close to real time, generally every five minutes as shown in FIG. 4, based on bids and offers and subject to the physical constraints of generation, load, and the transmission system. Specifically, the real-time market may utilize a "constrained" multi-lateral auction, in which supply and demand are matched in aggregate subject to physical constraints. The term "constrained" refers to a potential for congestion in the system, and as a result locational pricing of the system. The day-ahead hourly market provides an opportunity for participants to lock in price and quantity on the day before real-time operations. Like the real-time market, the day-ahead market is also often a "constrained" multi-lateral auction. The matching process for the day-ahead market produces quantities and marginal prices for each time period (usually an hour as shown in FIG. 4) and location (if applicable).

Referring back to FIG. 2, after execution of a trade, System Operator 220 may use the assets of Transmission Owners 232 in order to transmit electricity in accordance with the dispatch determined by the real-time market. Because more or less electricity may actually be produced or consumed than what was agreed to during trading, settlement 216 is performed by the Spot Market Operator 212 after the event. Settlement 216 uses Measurement and Verification 230 in order to determine the amount of electricity transferred. For a number of reasons, including delays in obtaining accurate measurement data for settlement, and historic convention, electricity spot market operators in North America have typically operated on a monthly billing cycle. Bills are sent approximately one week after the period being settled, with payment due approximately two weeks after that. This lengthy process results in 20-50 days of uncollected billings, depending upon which day in the settlement cycle the market is at. The RTO attempts to reduce its exposure by requiring some Participants 202 to post collateral. The amount that a Participant 202 posts depends on a Risk Assessment 218. The Risk Assessment 218 examines the credit ratings of the Participant 202, and any financial exposures it has in markets operated by the RTO. However, the RTO still extends unsecured credit to many participants, which may be equal to part or all of the participant's exposure, leaving the RTO at risk for the difference between potential exposure and posted collateral. Additionally, the Risk Assessment analysis is limited to markets and other payments facilitated through that RTO. Exposures of the participant in spot markets operated by other RTOs, or in futures markets, are not considered, limiting the value of Risk Assessment 218.

In the event of a Participant default, the RTO is held whole, with the default amount socialized amongst all remaining market participants according to pre-defined rules, which may differ by RTO. FIG. 5 shows an example of socialization by load/generation-ratio share. These exposures are unpredictable and unhedgeable. In an attempt to reduce the occurrence and severity of such defaults, RTOs have prudential processes, such as Risk Assessment 218, in place to manage credit risk. However, the processes currently implemented by many spot markets are not sufficient to manage the risks inherent in the trading of highly volatile commodities such as electricity.

Another shortcoming of the above-described system includes the method and frequency of credit limit determination. The procedures for determining credit limits, of which unsecured credit is generally a part, often do not follow a standard credit scoring methodology, leading to inconsistent credit assessments, and preventing automation. In addition, unsecured credit is often established based solely upon an assessment of a participant's financial standing, without consideration of the collective loss tolerance of the market in the event of default. Moreover, the timeliness of the credit reviews performed by many spot market operators is inadequate—taking place on a monthly, quarterly or annual basis—yet a participant's financial standing can disintegrate in a matter of days.

Still another shortcoming is the timeliness of credit monitoring. In the time interval between trading and the calculation of credit risk, the spot market operator is unaware of participants' true credit exposures. Some spot market operators experience a lag of three or more days in performing this assessment, during which time significant credit exposures can accumulate without the market operator necessarily being aware of them.

Another shortcoming of the above system is the length of the billing period. No matter how sophisticated the monitoring processes in place, the true test of a participant's creditworthiness is whether the participant pays its bill. Until this occurs, all outstanding amounts remain at risk. Many spot markets may operate on a monthly billing cycle. With a delay of approximately 20 days between the end of the settlement month and the bill being payable, plus time for remedy of potential defaults, this can lead to exposures exceeding 50 days of trading activity.

Yet another shortcoming is the fragmentation of risk across markets. As discussed above, the United States has multiple spot markets. This is also the case in Europe. It is not uncommon for companies to participate in a number of these spot markets. Currently, however, credit information about a participant in one spot market is seldom known to the operators of other spot markets. As a result, unsecured credit may be assigned without consideration of potential obligations in other markets. This poses the risk that, although each spot market may have dutifully completed its own credit analysis, the aggregate exposure of a participant may exceed its credit capacity.

Still another shortcoming is the layers of protection in the spot market trading. Currently some, but not all, spot market participants are required to post surety, to supplement their unsecured credit. This provides some protection in the event of default. In most markets, however, once the posted surety has been exhausted, there are no intermediate layers of protection between the defaulting participant and the socialized risk pool of all remaining participants.

Thus, there is a need to have a more secure and cost-efficient method and apparatus for spot market clearing.

BRIEF SUMMARY OF THE INVENTION

The invention comprises a method and system for clearing of spot market trades. A spot market operator may facilitate the execution of trades for a commodity. The spot market operator may send data indicative of settlement amounts for the executed trades to a spot market clearing house. The spot market clearing house may clear the spot market trades, using its clearing members as intermediaries.

In one aspect, the spot market clearing house may receive data indicative of multiple settlement amounts for a single executed trade. For example, the spot market clearing house may receive data indicative of an initial settlement amount for the executed trade. The initial settlement amount may be based on an estimate of an amount of the commodity transferred corresponding to the executed trade. Based on the data indicative of the initial settlement amount, the spot market clearing house may send an initial clearing statement to a clearing member. Moreover, the spot market clearing house may record a funds transfer in accordance with the initial clearing statement. For example, if the initial clearing statement indicates that the funds are owed to the spot market clearing house, the spot market clearing house may record when funds are transferred from the clearing member to the spot market clearing house. Or, if the initial clearing statement indicates that the spot market clearing house should transfer funds, the spot market clearing house may record the transfer of funds to the clearing member. Subsequent to receiving the data indicative of the initial settlement amount, the spot market clearing house may receive data indicative of a revised settlement amount for the executed trade. The data indicative of the revised settlement amount may be different from data indicative of the initial settlement amount. Based on the data indicative of the revised settlement amount, the spot market clearing house may send a revised clearing statement to a clearing member. Further, the spot market clearing house may record a funds transfer in accordance with the revised clearing statement. For example, if the revised clearing statement indicates that the funds are owed to the spot market clearing house, the spot market clearing house may record when the funds are transferred from the clearing member to the spot market clearing house. Or, if the revised clearing statement indicates that the spot market clearing house should transfer funds, the spot market clearing house may record the transfer of funds to the clearing member.

In another aspect of the invention, the spot market clearing house may receive data indicative of settlement amounts from a plurality of spot market operators. The spot market clearing house may aggregate the data indicative of settlement amounts for the trades from the plurality of spot market operators to indicate a net settlement amount for participants across the plurality of spot markets. Moreover, the spot market clearing house may determine a performance bond for participants based on the data indicative of the settlement amounts. The performance bond for a participant may be determined based on an analysis of trading with a single or multiple spot market operators for days equal to the number of days to collateralize. Finally, the spot market clearing house may send a clearing statement to a clearing member based on the aggregated settlement amounts and the performance bond.

DETAILED DESCRIPTION OF THE INVENTION

Figure 1:
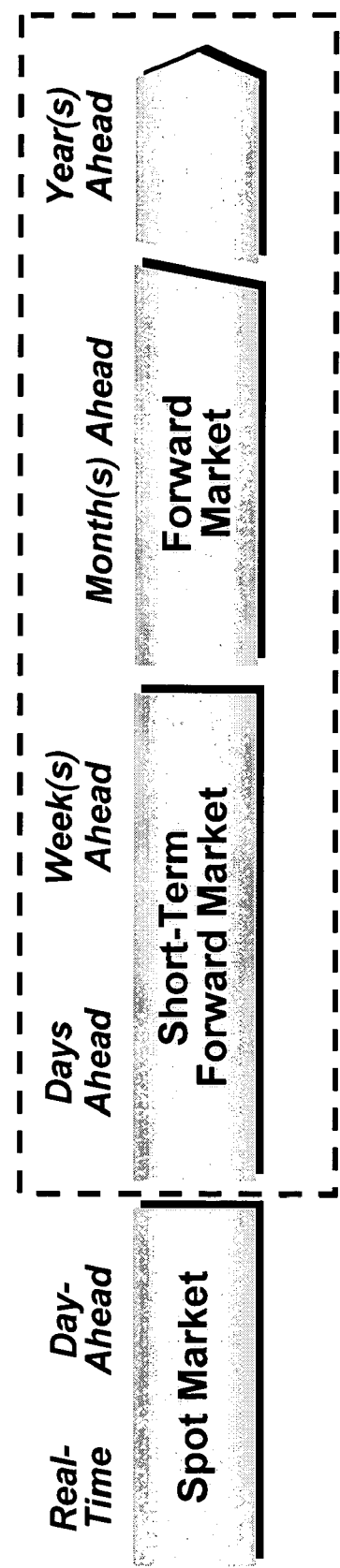
FIG. 1 is a diagram of the spot market in relation to the short-term forward market and forward market.

By way of overview, the preferred embodiments described below relate to a method and system for clearing of spot market trading activity. In one embodiment, functions of clearing trades are performed by a clearing house rather than the spot market operator. The clearing house may work in combination with clearing members in order to settle trading with the spot market operator. Clearing members may act as financial intermediaries between the market participant and the spot market clearing house. All market participants may have a clearing member, who has final accountability to the spot market clearing house for their customers' trading. Participants of sufficient financial standing may elect to become their own clearing members.

Clearing houses have been used in the context of the futures market. In contrast to such application, the clearing house in the present application is applied to and modified for the spot market context. The clearing house for the spot market may alter the way in which spot market credit risk is managed. For example, the clearing house may become the central counterparty to spot market transactions for participating spot markets. Further, performance bonds may be levied based upon a probabilistic assessment of potential spot market exposures. All exposures may be collateralized such that there is no unsecured credit. In addition, settlement with the spot market clearing house may occur according to a pre-determined cycle, such as every weekday that is not a bank holiday, thereby realizing all gains and losses incurred. Settlement values may continue to be calculated by the spot market operators, with the spot market clearing house responsible for managing the actual payment process such as the transfer of funds. The spot market clearing processes may follow similar cycles to forward markets, such as the same daily cycle, and thereby work in conjunction or in combination with the forward markets. For example, performance bond and settlement amounts for spot market trading may be presented each weekday morning, payable later the same morning, using the same clearing statements and funds transfers which apply to forward market trading. Moreover, the spot market clearing house may be integrated into the existing spot market framework. In one scenario, as discussed in more detail in FIGS. 14a and 14b, all participants in the spot market may clear via the clearing house. In another scenario, as discussed in more detail in FIG. 14c, participants in the spot market may elect or may not elect to move to the spot market clearing house. Those participants electing not to move to the spot market clearing house continue to remain part of the socialized risk pool for that spot market.

By using the clearing house in this manner, the problems as discussed in the background section are addressed. For example, credit processes may become standardized, not just across participants, but across all participating spot markets thereby providing a more consistent view of credit risk. Moreover, credit exposures may become known sooner. Specifically, the elimination of unsecured credit increases the probability that, in the event of a default, posted surety will be sufficient to cover outstanding liabilities. Further, daily settlement, calculated and paid the morning after, reduces the potential exposure to only two days versus the 20-50+ days which can currently exist. In addition, trades are backed by the full strength of a clearing house, with its multiple layers of guarantee.

Spot market clearing also produces a number of additional benefits to market participants. Collateral requirements may be reduced representing a reduction for almost any participant not trading wholly on unsecured credit. Specifically, since the billing cycle is reduced, the amount of exposure is similarly reduced. For example, under prior art systems, a participant's exposure may span upwards of 50 days. Under the billing system of the present invention, a participant's exposure may only span a few days, thereby reducing the collateral requirements. Further, settlement and performance bond amounts can be netted across all participating spot markets. As one example, a participant may trade in several spot markets. In order to trade in the several spot markets, the participant may be required to submit several collateral deposits. In contrast, by using a clearing house to settle across several spot markets, the total of a single performance bond required to trade across the several spot markets may be less than the total of the several performance bonds previously required, as exposures are assessed in aggregate, on a portfolio basis. Moreover, the settlement and performance bond amounts may also be netted against the participant's forward market exposures. In addition, the shorter settlement cycle may allow net producers to be paid sooner, improving their float and in turn reducing the cost of funds required to pay for this float. Thus, the spot market clearing house may lead to substantial reduction in risk exposure, as well as providing substantial cash management and process improvement benefits.

Figure 2:
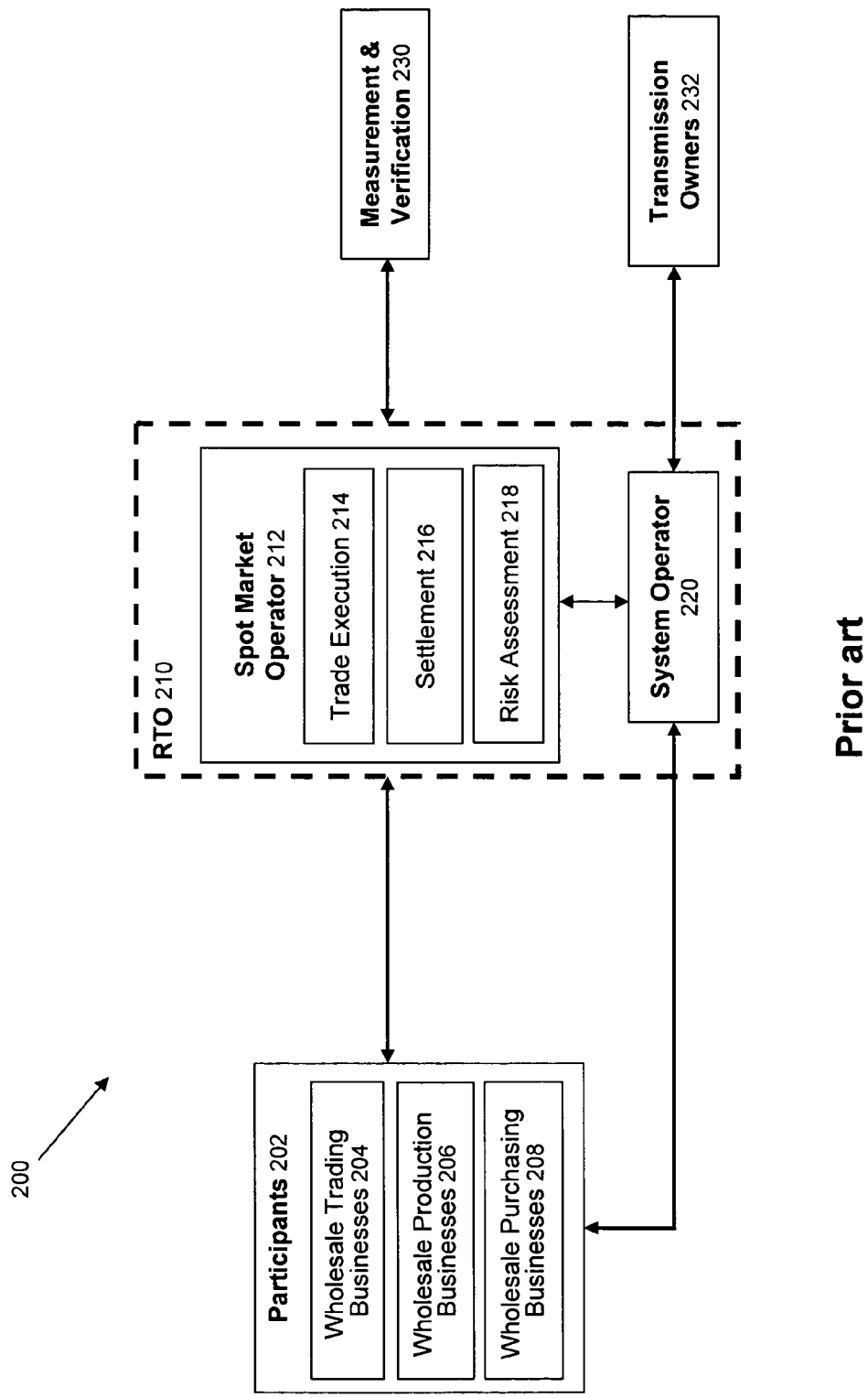
FIG. 2 is a block diagram of a prior art configuration for spot market operations.
Figure 3:
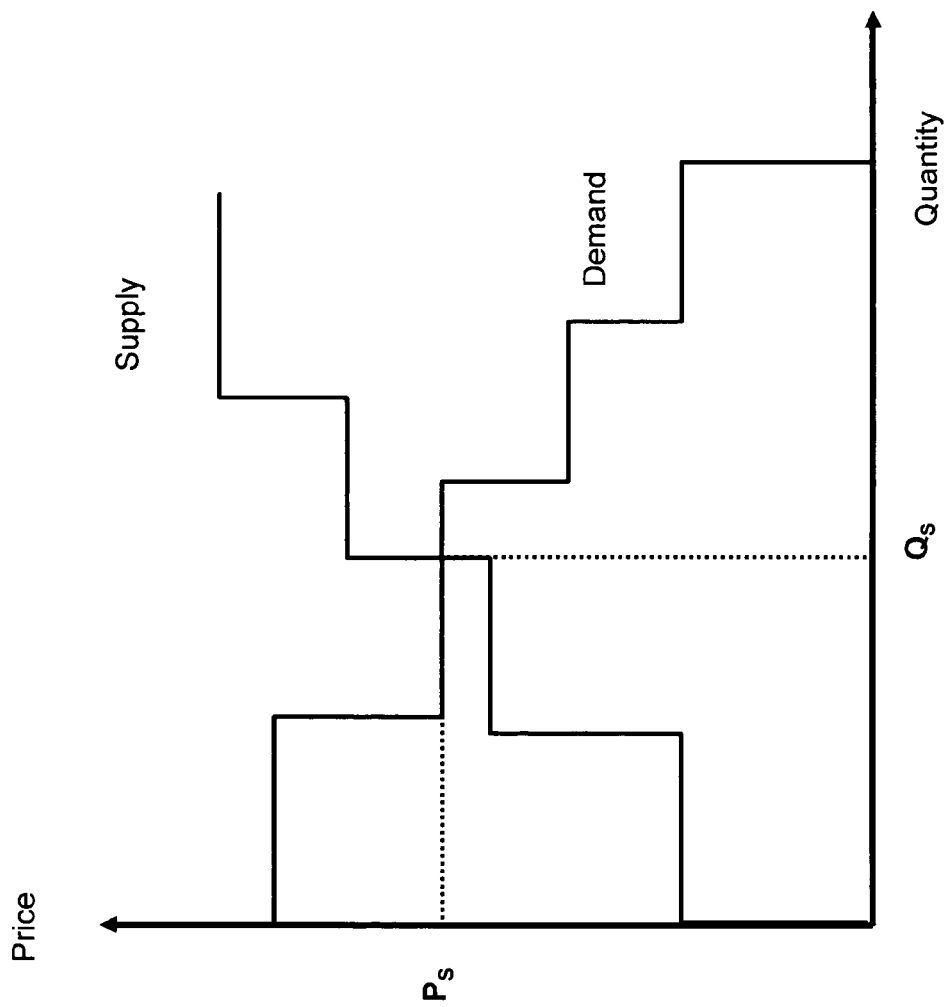
FIG. 3 is a graph showing the simple matching of supply and demand curves, based upon offers and bids respectively, in order to determine scheduled/dispatched quantity and marginal price.
Figure 4:
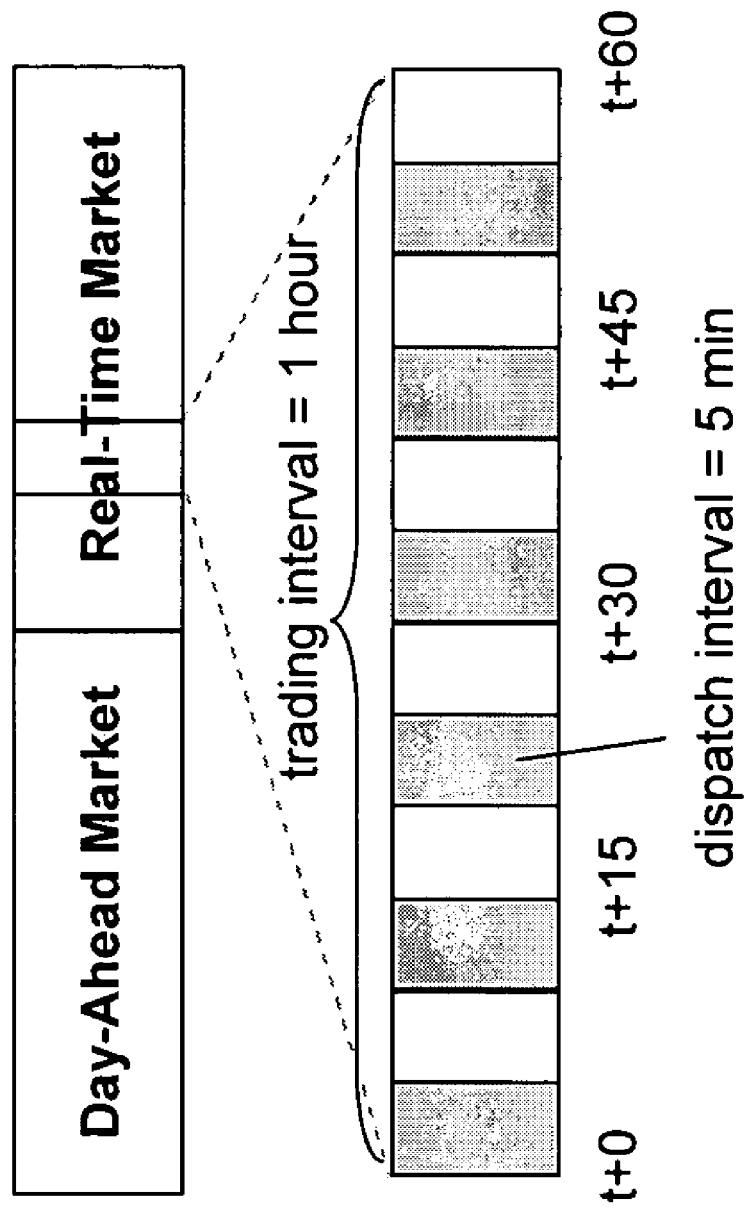
FIG. 4 is a stylistic representation of the real-time market and day-ahead market.
Figure 5:
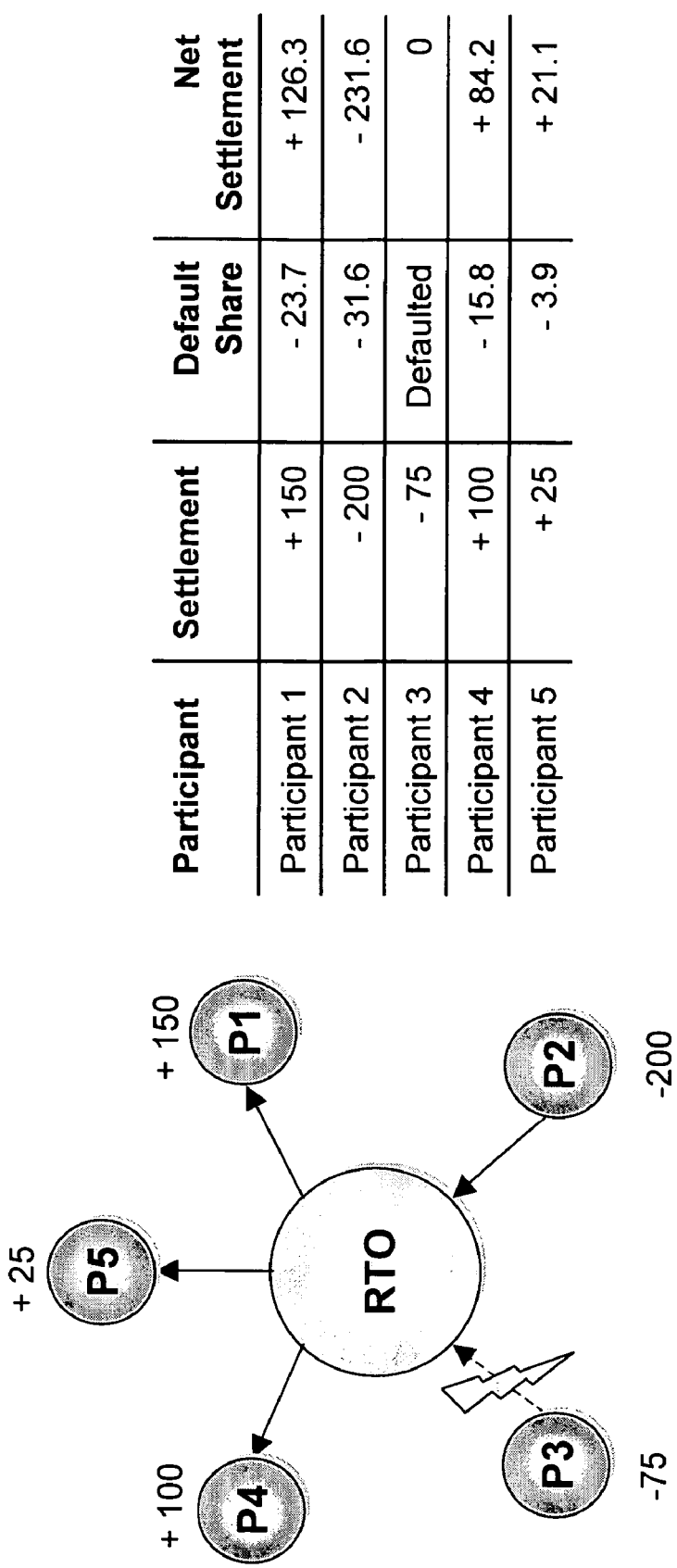
FIG. 5 is a block diagram and table illustrating socialization of a default by load/generation-ratio share.
Figure 6:
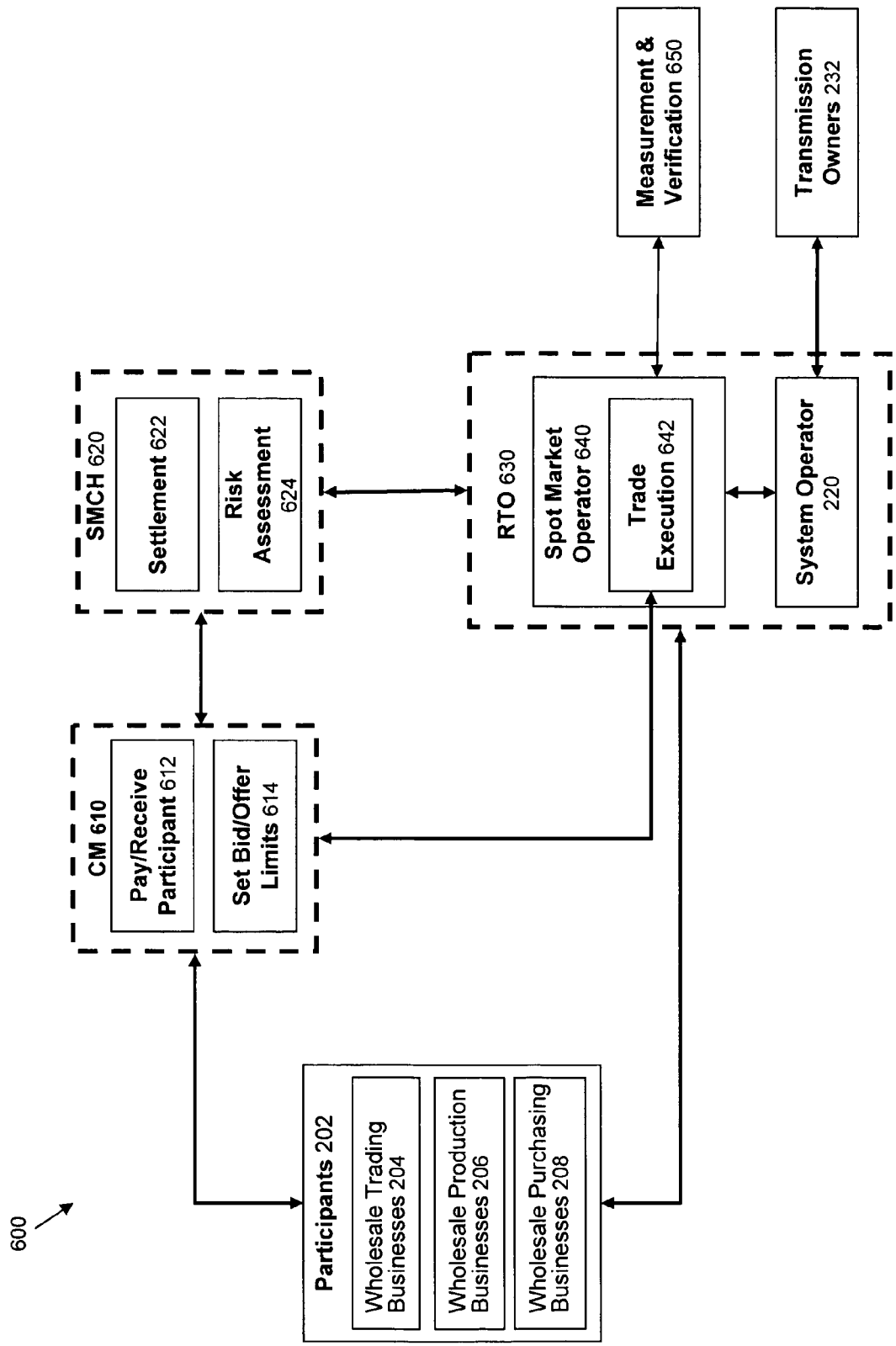
FIG. 6 is a block diagram of one embodiment of spot market operator in combination with a clearing house providing spot market clearing.

In the drawings where like reference numerals refer to like elements, FIG. 6 shows a block diagram 600 of one embodiment of spot market operator in combination with a spot market clearing house. Participants 202, similar to the Participants 202 in FIG. 2, may include Wholesale Trading Businesses 204, Wholesale Production Businesses 206, and Wholesale Purchasing Businesses 208. Participants 202 may trade in markets facilitated by the RTO 630 by using the Trading Execution functionality 642 of Spot Market Operator 640. As discussed in more detail in FIG. 9, the Participants 202 may submit bids or offers to the Spot Market Operator 640. Prior to executing a trade, the Spot Market Operator 640 may validate these bids/offers against credit limits, established by the Clearing Member (CM) 610 using Bid/Offer Limit functionality 614. Alternatively, the credit limits for bids and/or offers may be input by the Spot Market Clearing House (SMCH) 620. In real-time, System Operator 220 ensures transmission of the electricity over the transmission assets of the Transmission Owners 232.

After transmission of the electricity, the Spot Market Operator 640 may determine the amount of electricity transferred using Measurement and Verification functionality 650. In one embodiment, the Spot Market Operator 640 makes a multiple step determination wherein an initial estimate is made of the amount of electricity transferred followed by a single more accurate determination or multiple more accurate determinations based on actual or measured quantities. The Spot Market Operator 640 may then calculate and transfer the net settlement amount for any real-time markets (including the real-time energy market), both for the current period's transactions (such as the current day's transactions) and for previous period's transactions (such as previous days). This net settlement amount comprises data indicative of the current period's transactions and data indicative of previous period's transactions. Specifically, as revised quantities (actual or estimated) become available, the Spot Market Operator 640 may adjust prior period settlement amounts. The net settlements may be sent at predetermined times, such as on a daily basis. Settlement for day-ahead markets (including the day-ahead energy market) may be based upon scheduled, rather than measured quantities. Alternatively, rather than transferring a net settlement amount for a specific participant, the Spot Market Operator 640 may transfer data including: (1) a listing of trade(s) for the current period indicating whether the participant owes or is owed for each of the trade(s) the participant engaged in for the current period; and (2) a listing of trade(s) for previous period(s) indicating whether the participant owes or is owed for each of the trade(s). The Spot Market Operator Clearing House 620 may receive this data indicative of the current period's transactions and data indicative of previous periods' transactions and calculate a net settlement amount for the participant.

Figure 12:
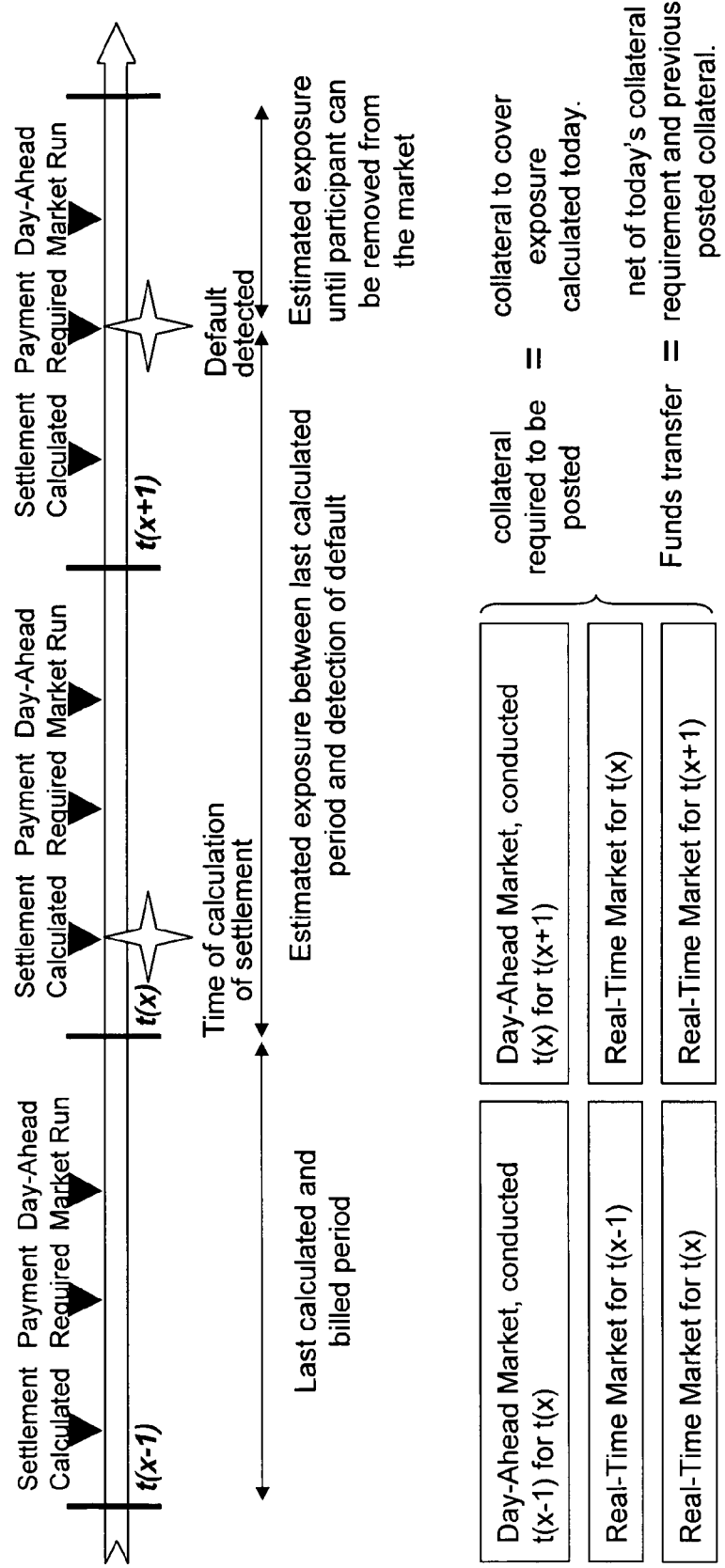
FIG. 12 is a timeline of an exemplary performance bond process.

After receiving settlement amounts for the current and/or previous periods from the Spot Market Operator 640, the Spot Market Clearing House 620 may assess a performance bond for each participant using Risk Assessment 624. As discussed with respect to FIGS. 9 and 12, the Spot Market Clearing House 620 may levy a performance bond upon one, some, or all participants based upon a probabilistic assessment of potential spot market exposures. This assessment, which may be performed every business day, is intended to cover liabilities which might be incurred in the period between the last settlement which occurred, and possible detection of a default (and the subsequent removal of this participant from the market). Because funds may only be transferred during days on which the Fedwire system is open, performance bond may be higher on the day before a weekend and/or bank holiday. These exposures may be fully collateralised to a given statistical likelihood, such as 99%.

The Spot Market Clearing House 620 may further comprise Settlement functionality 622. Settlement functionality 622 may include performing banking processes by sending a clearing statement to clearing members, such as Clearing Member 610. This facilitates movement of funds between the Clearing House 610 and its clearing members, such as Participants 202, based on settlement (as sent from the RTOs) and based on performance bond balances (based on Risk Assessment 624). Traded amounts may be settled for a predetermined period. For example, the traded amounts may be settled each business day, realising all gains and losses incurred up until the end of the previous day's trading, such as until midnight. Settlement values may be calculated by the Spot Market Operator 640, with the Spot Market Clearing House 620 performing the actual settlement. For example, the Spot Market Operator 640 may determine a net settlement amount for a specific participant based on all of the trades that the participant has made through the Spot Market Operator 640 for the predetermined period (such as the net amount owed to or owed by a participant for all trades in the current trading day based on initial estimates) and/or based on trades that the participant has made through the Spot Market Operator 640 for periods prior to the predetermined period (such as the net amount owed to or owed by a participant for all trades in previous trading day(s) based on revised estimates). The Spot Market Operator 640 may then send data indicative of the net settlement amount to the Spot Market Clearing House 620 for settlement. Alternatively, the Spot Market Operator 640 may send to the Spot Market Clearing House 620 data indicative of all trading for a specific participant for all of the trades that the participant has made with the Spot Market Operator 640 for the predetermined period (such as a listing of all of the trades in a current trading day and corresponding amounts owing to or owed by a participant based on initial estimates) and/or based on all of the trades that the participant has made with the Spot Market Operator 640 for a period prior to the predetermined period (such as a listing of all of the trades in previous trading day(s) and corresponding amounts owing to or owed by a participant based on revised estimates). The Spot Market Clearing House 620 may then calculate a net settlement amount based on the data indicative of all trading, and then settle the amount with a clearing member. When Clearing Member 610 receives a clearing statement from Spot Market Clearing House 620, Clearing Member 610 may use Pay/Receive Participant functionality 612 in order to pay funds to or receive funds from Participants 202.

Figure 7:
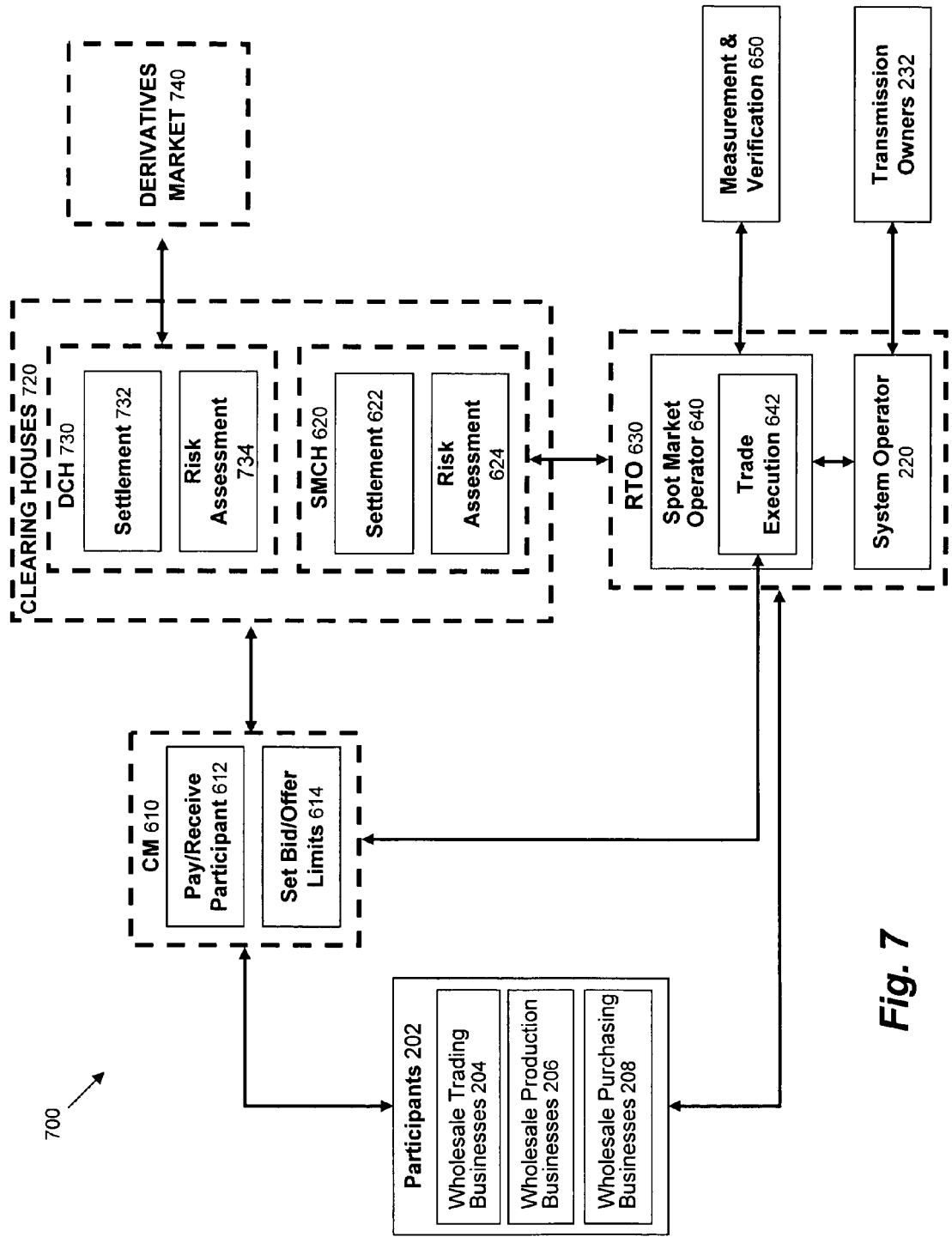
FIG. 7 is a block diagram of another embodiment of spot market operator in combination with a clearing house providing both spot market and derivatives clearing.

FIG. 7 is a block diagram 700 of another embodiment of spot market operator in combination with a spot market clearing house. FIG. 7 is similar to FIG. 6 in that Participants 202 may trade in markets facilitated by the Spot Market Operator 640 using Trade Execution functionality 642. Settlements values may be calculated by the Spot Market Operators 640, with the Spot Market Clearing House 620 performing the actual settlement via the Clearing Members 610.

As shown in FIG. 7, the Spot Market Clearing House 620 may be incorporated in a Clearing House structure, such as Clearing Houses 720. The Clearing House structure may include other clearing houses, such as a Derivatives Clearing House 730. Derivatives Clearing House 730 may receive settlement information from Derivatives Market 740 in order to determine Settlement and Risk Assessment functionality 732, 734. As shown in FIG. 7, the Spot Market Clearing House 620 and the Derivatives Clearing House 730 are separate entities so that they may be implemented in separate programs or on separate computers. Alternatively, the Spot Market Clearing House 620 and the Derivatives Clearing House 730 may be integrated. For example, the Spot Market Clearing House 620 and the Derivatives Clearing House 730 may be implemented in one program and/or on one machine with the settlement information input from the Spot Market Operator 640 and Derivatives Market 740 to the combined clearing house in order to determine settlement and performance bond for both forward and spot trading.

Figure 8:
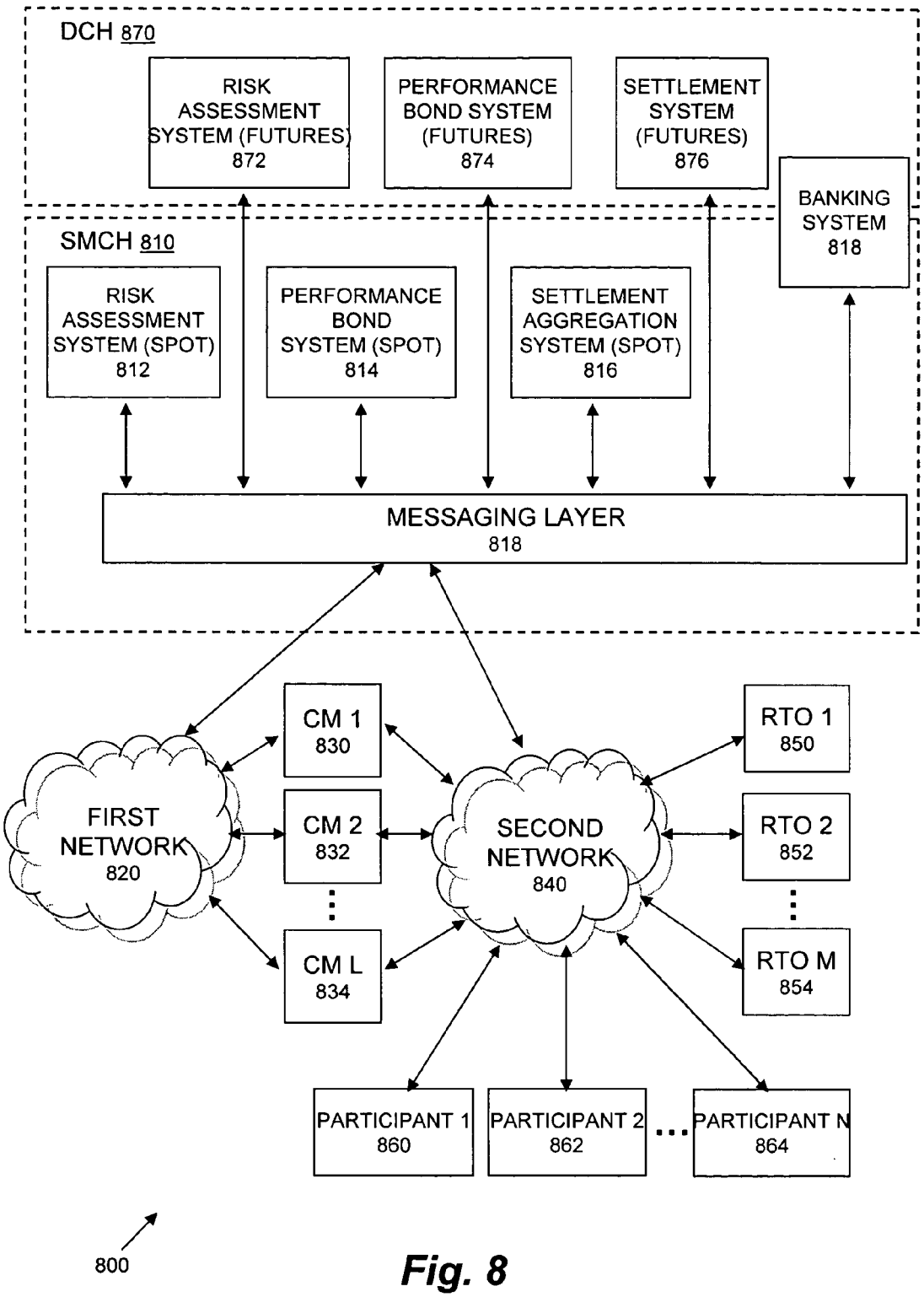
FIG. 8 is a block diagram of still another embodiment of a spot market clearing house in combination with RTOs, Participants, and clearing members.

FIG. 8 is a block diagram 800 of still another embodiment of a Spot Market Clearing House 810 in combination with RTOs (860, 862, 864), Participants (870, 872, 874), and Clearing Members (840, 842, 844). Spot Market Clearing House 810, RTOs (860, 862, 864), Participants (870, 872, 874), and Clearing Members (840, 842, 844) may each be connected to a single or multiple networks. As shown in FIG. 8, Spot Market Clearing House 810 and Clearing Members (840, 842, 844) are connected to a first network 830 and to a second network 850. The first network 830 may comprise a local area network (LAN) and/or a wide area network (WAN) and the second network 850 may comprise the Internet. Various other networking configurations may be used.

Spot Market Clearing House 810 may comprise a general purpose computing device, including a processing unit, a system memory, and a system bus, that couples various system components including the system memory to the processing unit. The processing unit may perform arithmetic, logic and/or control operations by accessing system memory. The system memory may store information and/or instructions for use in combination with processing unit. The system memory may include volatile and non-volatile memory, such as random access memory (RAM) and read only memory (ROM). A basic input/output system (BIOS) containing the basic routines that helps to transfer information between elements within the Spot Market Clearing House, such as during start-up, may be stored in ROM. The system bus may be any of several types of bus structures including a memory bus or memory controller, a peripheral bus, and a local bus using any of a variety of bus architectures. The Spot Market Clearing House 810 may further include a hard disk drive for reading from and writing to a hard disk (not shown), and an external disk drive for reading from or writing to a removable external disk. The removable disk may be a magnetic disk for a magnetic disk driver or an optical disk such as a CD ROM for an optical disk drive. The hard disk drive and external disk drive may be connected to the system bus by a hard disk drive interface and an external disk drive interface, respectively. The drives and their associated computer-readable media provide nonvolatile storage of computer readable instructions, data structures, program modules and other data for the Spot Market Clearing House 810. Although the exemplary environment described herein employs a hard disk and an external disk, it should be appreciated by those skilled in the art that other types of computer readable media which can store data that is accessible by a computer, such as magnetic cassettes, flash memory cards, random access memories, read only memories, and the like, may also be used in the exemplary operating environment. A number of program modules may be stored on the hard disk, external disk, ROM or RAM, including one or more application programs, other program modules (not shown), an operating system (not shown), and program data. One such application program may comprise a Settlement Aggregation System (Spot) 816. The Settlement Aggregation System (Spot) 816 may include functionality which aggregates a net settlement for a participant based upon trades from a particular RTO (if the RTO does not send a net settlement amount but a listing of trades) and/or may include functionality which aggregates a net settlement for a participant based upon trades from a plurality of RTOs. Further, the Spot Market Clearing House 810 may further comprise a Risk Assessment System (Spot) 812 which may include some elements of spot market Risk Assessment functionality 624 discussed previously. In addition, another application program in Spot Market Clearing House 810 may comprise a Performance Bond System (Spot) 814 which includes the remaining elements of Risk Assessment functionality 624, and determines a performance bond based on the outputs of the Risk Assessment System (Spot) 812. Also, the Spot Market Clearing House 810 may further comprise a Banking System 818 which request fund transfers based on the calculations for the aggregate settlement and the performance bond. Additionally, should Clearing House 720 also incorporate derivatives clearing, such as that described in Derivatives Clearing House 730, a number of additional applications may also be incorporated, such as Risk Assessment System (Futures) 872 and Performance Bond (Futures) System 874, which may include futures market Risk Assessment functionality 734 discussed previously, and Settlement System (Futures) 876 which may include futures market Settlement functionality 732 as discussed previously. The Banking System 818 would be the same across both spot and derivatives clearing. The Risk Assessment System (Spot) 812, Performance Bond System (Spot) 814, Settlement Aggregation System (Spot) 816, Risk Assessment System (Futures) 872, Performance Bond System (Futures) 874, Settlement System (Futures) 876 and the Banking System 818 may communicate with one another and/or with devices external to the Spot Market Clearing House via the Messaging Layer 820. In particular, the Message Layer 820 may act as middleware enabling standard communications between the various layers within the Spot Market Clearing House and with outside networks such as First Network 830 and Second Network 850.

A user may enter commands and/or information into Spot Market Clearing House 810 through input devices such as a mouse and a keyboard (not shown). Other input devices (not shown) may include a microphone (or other sensors), joystick, game pad, scanner, or the like. These and other input devices may be connected to the processing unit through a serial port interface that is coupled to the system bus, or may be collected by other interfaces, such as a parallel port interface, game port or a universal serial bus (USB). A monitor, or other type of display device, may also be connected to the system bus via an interface, such as a video input/output. In addition to the monitor, Spot Market Clearing House 810 may include other peripheral output devices (not shown), such as speakers or other audible output.

As discussed above, Spot Market Clearing House 810 may communicate with other nodes on Network such as RTOs (860, 862, 864), Participants (870, 872, 874), and Clearing Members (840, 842, 844). RTOs (860, 862, 864), (870, 872, 874), and Clearing Members (840, 842, 844) may include many or all of the elements described above relative to Spot Market Clearing House 810. As shown in FIG. 8, there is a plurality of Clearing Members, including Clearing Member 1 (840), Clearing Member 2 (842) to Clearing Member L (844), a plurality of RTOs, including RTO 1(860), RTO 2 (862) to RTO M (864), and a plurality of Participants, including Participant 1 (870), Participant 2 (872) to Participant N (874). Each of the Participants, RTOs, Clearing Members, and Spot Market Clearing House may communicate with one another. Thus, Participant 1 (870) may trade via Second Network 850 with a plurality of RTOs. The plurality of RTOs may send settlement information to Spot Market Clearing House 810. Spot Market Clearing House 810 may communicate with the plurality of Clearing Members in order to pay/receive funds from any participant, including Participant 1 (870). In this manner, Participant 1 (870) may trade with a variety of RTOs using a single clearing house.

Figure 9:
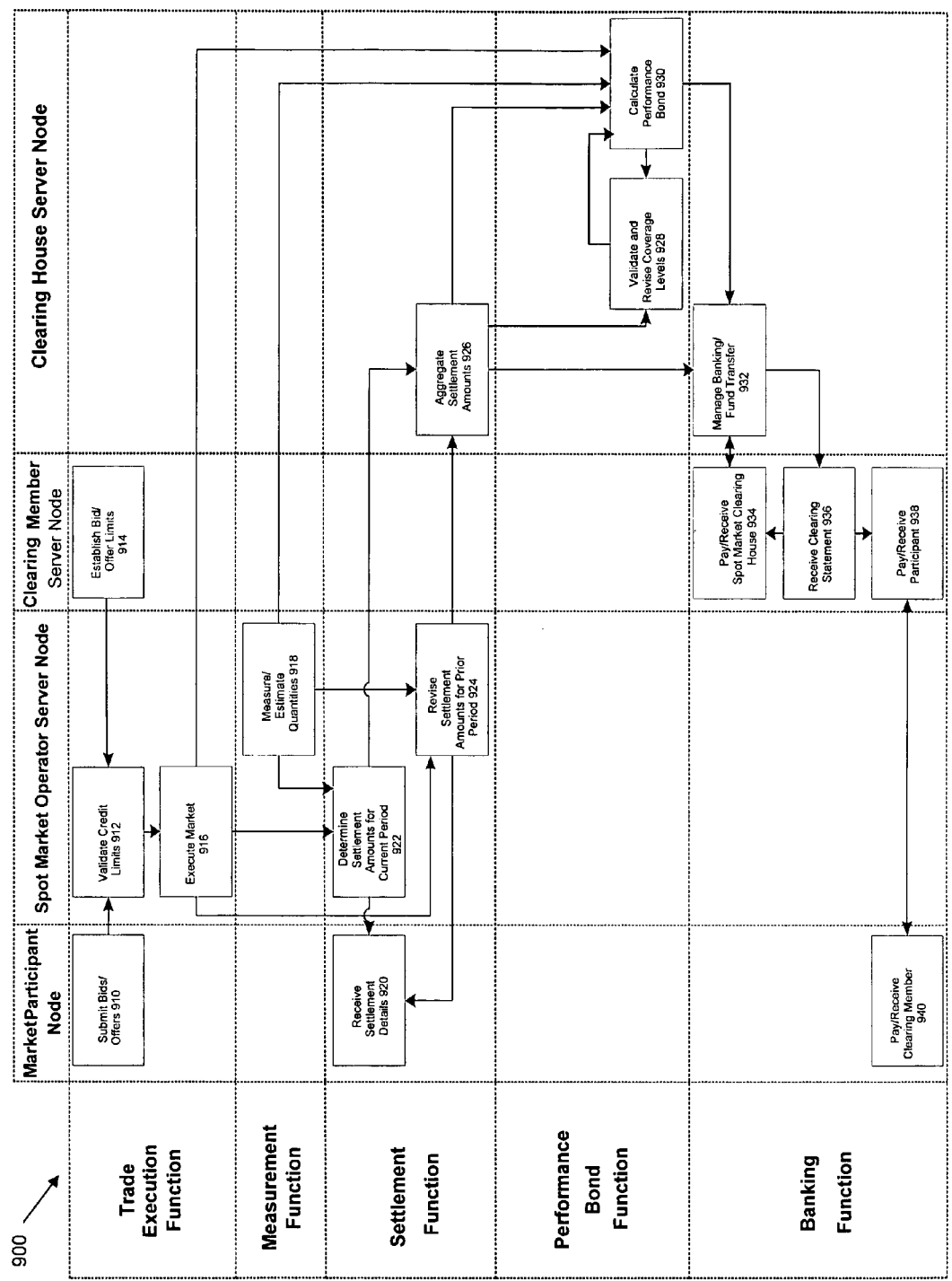
FIG. 9 is a flow diagram providing an example of the spot market clearing process, from trade execution through measurement, settlement, performance bond (collateral) determination, and banking.

FIG. 9 is a flow diagram 900 of an example spot market clearing process, incorporating trade execution functionality, measurement functionality, settlement functionality, performance bond functionality, and banking functionality. Trade execution functionality is discussed with regards to blocks 910 to 916. As shown at block 910, the participant, via a market participant node, may submit bids and/or offers to the Spot Market Operator, via a spot market operator server node. Through the submissions, the sellers may offer supply and buyers may bid demand into the spot market. As shown at block 914, the Clearing Member may establish bid and/or offer limits. As discussed previously, Clearing Members may act as financial intermediaries between Participants and the Spot Market Clearing House. The Clearing Members, via a clearing member server node, may define and monitor Participant bid/offer limits based on a Participant's current exposure and solvency. In the event that the Participant is a Clearing Member, where the Participant has sufficient financial standing to become a Clearing Member, the Participant may define and monitor its bid/offer limits. Alternatively, the Spot Market Clearing House may define and monitor Participant bid/offer limits. As shown at block 912, the Bids/Offers are validated against the Bid/Offer limits as established by the Clearing Member. For example, if a bid is within the bid limits of a specific participant, the bid is validated. If the Bids/Offers are validated, the market is executed, as shown at block 916. As discussed above, execution of the spot market may be conducted by the Spot Market Operator.

Measurement functionality is discussed with regard to block 918. After market execution of real-time markets (including the real-time energy market), the quantities are measured and/or estimated, as shown at block 918. The RTO may use meters to measure hourly quantities for most participant installations/locations. These quantities may be used in the calculation of a number of settlement items. Final settlement data for the real-time market may not be available until some time after the event, whereas final settlement data for the day-ahead market may be available at the time of trade execution. In one embodiment, settlement may be performed in multiple stages with an initial estimate stage followed later by more accurate data. The multiple stage approach to settlement allows for quicker initial settlement, potentially reducing accuracy in order to achieve more timely settlement, and allows for a later more accurate settlement or true-up. There are a variety of sources of data which may be used for calculation of interim estimates. One such source of data is the State Estimator results, which is a component of the Energy Management System. The State Estimator uses the real-time data on a measured subset of system facilities, combined with a complex mathematical model of the power system that reflects the configuration of the network and real-time system condition, in order to estimate flows, voltages and other information describing the state of the system. Another source of data is the bids and offers. Using bids and offers as an estimate assumes that the amount of electricity dispatched in the trade execution represents an acceptable estimate of the actual delivered electricity. Any one, some, or all of the sources of data for calculation of interim estimates may be used. In addition, the interim estimates may be calculated for any period, included estimated hourly quantities. Initial estimates may further be updated once or a number of times with more accurate results before a settlement becomes final. For example, state estimator results may be used initially, to be replaced by metered data as it becomes available.

Settlement functionality is discussed with regard to blocks 920 to 926. As discussed above, the Spot Market Operator, via a spot market operator server node, may provide different types of data, such as estimated, measured or a combination of estimated and measured data, in order to settle the trade. When a multiple stage approach to settlement is used, the Spot Market Operator may determine initial settlement amounts for the current period, such as the current day of trading, as shown at block 922. The initial settlement amounts for the current period may be determined based on estimated or measured quantities. Further, the Spot Market Operator may determine revised settlement amounts for a previous period, as shown at block 924.

The revised settlement amounts may be based on more accurate estimation or measurement. For example, the revised settlement amount may indicate that additional funds should be transferred from the Clearing Member to the Spot Market Clearing House. This may occur in two instances. First, if the initial settlement amount indicated that the Clearing Member should transfer funds to the Spot Market Clearing House, and the revised settlement amount indicates that the initial settlement amount was too low (i.e., the Participant owes additional funds), the revised settlement amount may indicate the additional amount owed. Second, if the initial settlement amount indicated that the Spot Market Clearing House should transfer funds to the Clearing Member, and the revised settlement amount indicates that the initial settlement amount was too high (i.e., the Spot Market Clearing House transferred too much funds), the revised settlement amount may indicate the amount to be returned to the Spot Market Clearing House.

As another example, the revised settlement amount may indicate that additional funds should be transferred from the Spot Market Clearing House to the Clearing Member. This may occur in two instances. First, if the initial settlement amount indicated that the Clearing Member should transfer funds to the Spot Market Clearing House, and the revised settlement amount indicates that the initial settlement amount was too high (i.e., the Spot Market Clearing House requested too much funds), the revised settlement amount may indicate the amount to be returned. Second, if the initial settlement amount indicated that the Spot Market Clearing House should transfer funds to the Clearing Member, and the revised settlement amount indicates that the initial settlement amount was too low (i.e., the Spot Market Clearing House transferred too little funds), the revised settlement amount may indicate the additional amount to be transferred to the Clearing Member.

The data sent from the Spot Market Operator may be aggregated for each participant, indicating a net amount either owed to the Spot Market Operator or a net amount owed to the Participant. For example, a Participant may engage in a series of trades in a predetermined period, such as one trading day. The Spot Market Operator may determine initial settlement amounts for each of the series of trades in the predetermined period. The Spot Market Operator may then determine a net initial settlement amount based on the series of trades. The Spot Market Operator may send data indicative of the net initial settlement amount to the Spot Market Clearing House, via a spot market clearing house server node. Alternatively, the Spot Market Operator may send data indicative of the initial settlement amounts for each of the series of trades to the Spot Market Clearing House, with the Spot Market Clearing House aggregating the data, as discussed below with respect to block 926, to determine the net initial settlement amount. The settlement amounts and revised settlement amounts may be sent to the participant for informational purposes, as shown at block 920.

Figure 10:
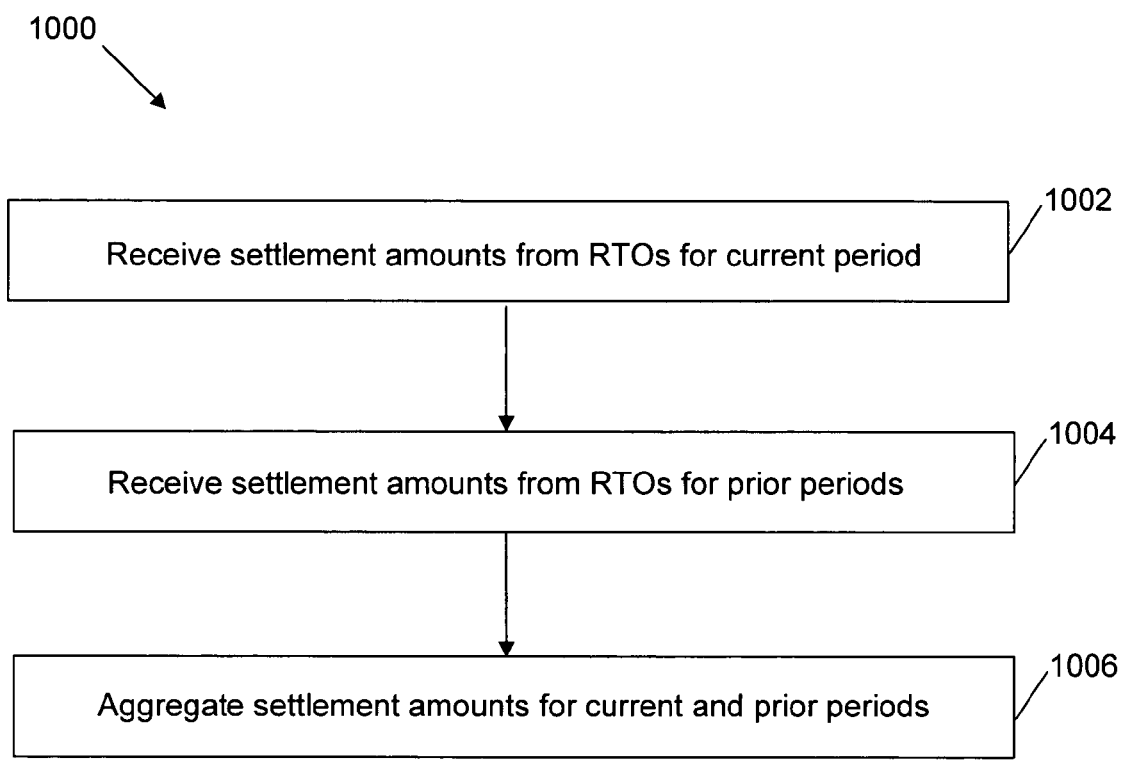
FIG. 10 is a flow chart of an exemplary aggregation of settlement amounts as illustrated in FIG. 9.

The Spot Market Clearing House may aggregate the data indicative of the settlement amounts as shown at block 926. FIG. 10 is a flow chart 1000 of an exemplary aggregation of settlement amounts as illustrated in block 926 in FIG. 9. The Spot Market Clearing House may receive settlement amounts from one or a plurality of RTOs for the current period, as shown at block 1002. As discussed above, the Spot Market Clearing House may communicate with one or a plurality of RTOs, receiving settlement data from each. The Spot Market Clearing House may also receive settlement amounts from one or a plurality of RTOs for a previous period or previous periods, as shown at block 1004. The Spot Market Clearing House may aggregate the settlement amounts for the current period and the prior periods, as shown at block 1006. Further, if the Spot Market Clearing House works in conjunction with a Derivatives Clearing House, as shown in FIG. 8, the aggregated settlement amounts determined in block 1006 may be combined with settlement amounts determined from the Derivatives Clearing House.

Figure 11:
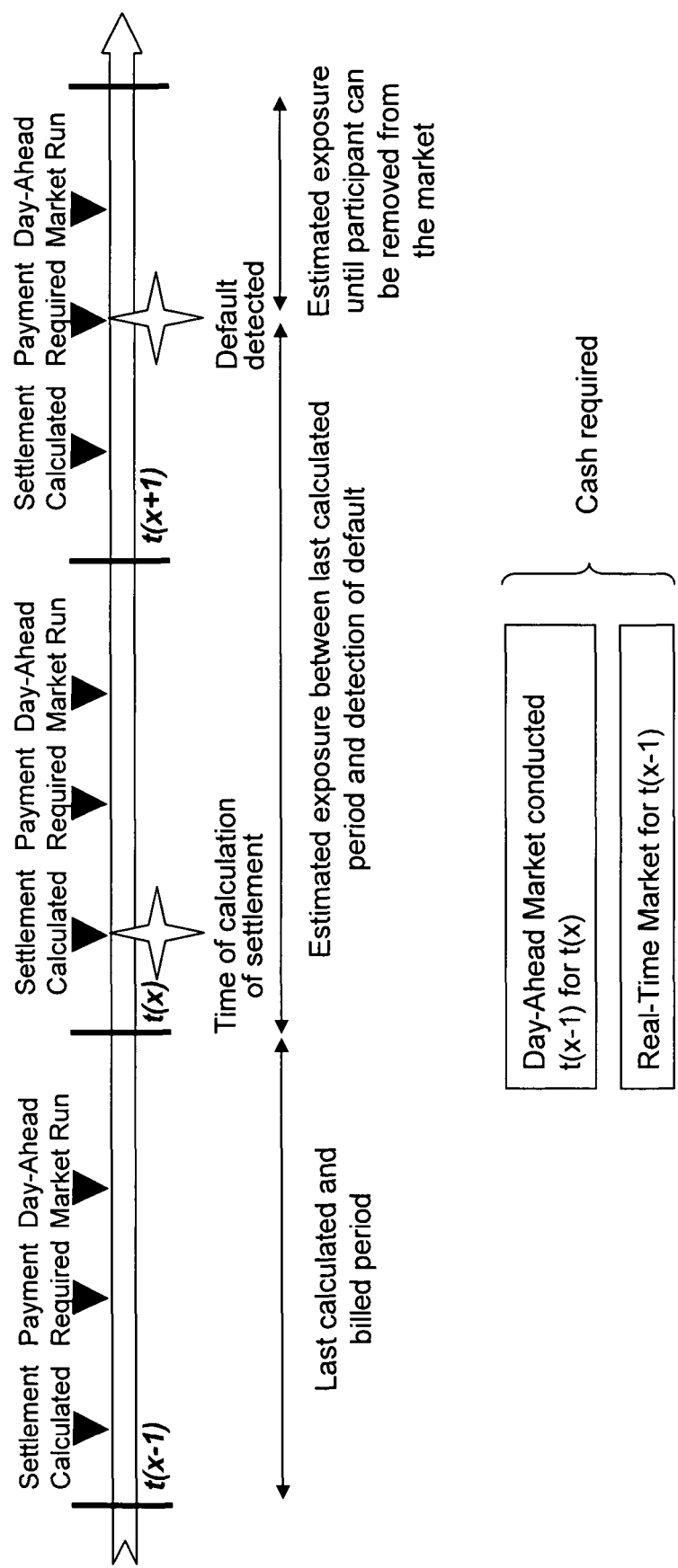
FIG. 11 is a timeline of an exemplary settlement process.

As discussed above, the net settlement amount for the current period's transactions may be calculated by the RTO and sent to Spot Market Clearing House. These settlement values may include the day-ahead market conducted on the previous day ($t_{x-1}$) for the current day ($t_x$), and the real-time market for the previous day ($t_{x-1}$). FIG. 11 represents a timeline of an exemplary settlement process. As shown in FIG. 11, the settlement may be calculated in the period following the trading period. For example, the Spot Market Clearing House may calculate settlement for $t_{x-1}$ the morning of $t_x$. Thereafter, the Spot Market Clearing House may request payment thereafter. As revised quantities (actual or estimated) become available, the RTO may adjust any prior period settlement amounts. This may result in adjustments to the amounts settled/transferred by the Spot Market Clearing House.

Referring back to FIG. 9, the Performance Bond functionality is discussed with regard to blocks 928 to 930. The Spot Market Clearing House may determine the performance bond for one, some, or all of the participants, as shown at block 1030. The Spot Market Clearing House's determination of performance bond may be based on a variety of factors including the markets (i.e. day-ahead, real-time, FTR) and the RTOs in which the Participant trades. For the day-ahead market, in order to determine the performance bond, the Spot Market Clearing House may calculate risk exposure based on activity expected to be transacted on the current day ($t_x$) for the following day ($t_{x+1}$). For the real-time market, in order to determine the performance bond, the Spot Market Clearing House may calculate risk exposure based upon: (1) activity expected to be transacted in the current day ($t_x$) and the following day ($t_{x+1}$) until default is detected (payment is not made at time for required payment); and/or (2) any residual activity between when a default is detected and the participant can be removed from the system (currently assumed to be end of day). These exposures are shown in the exemplary timeline of FIG. 12. The risk exposure may translate into a performance bond value for each participant, which may be taken in the form of liquid collateral.

Figure 13:
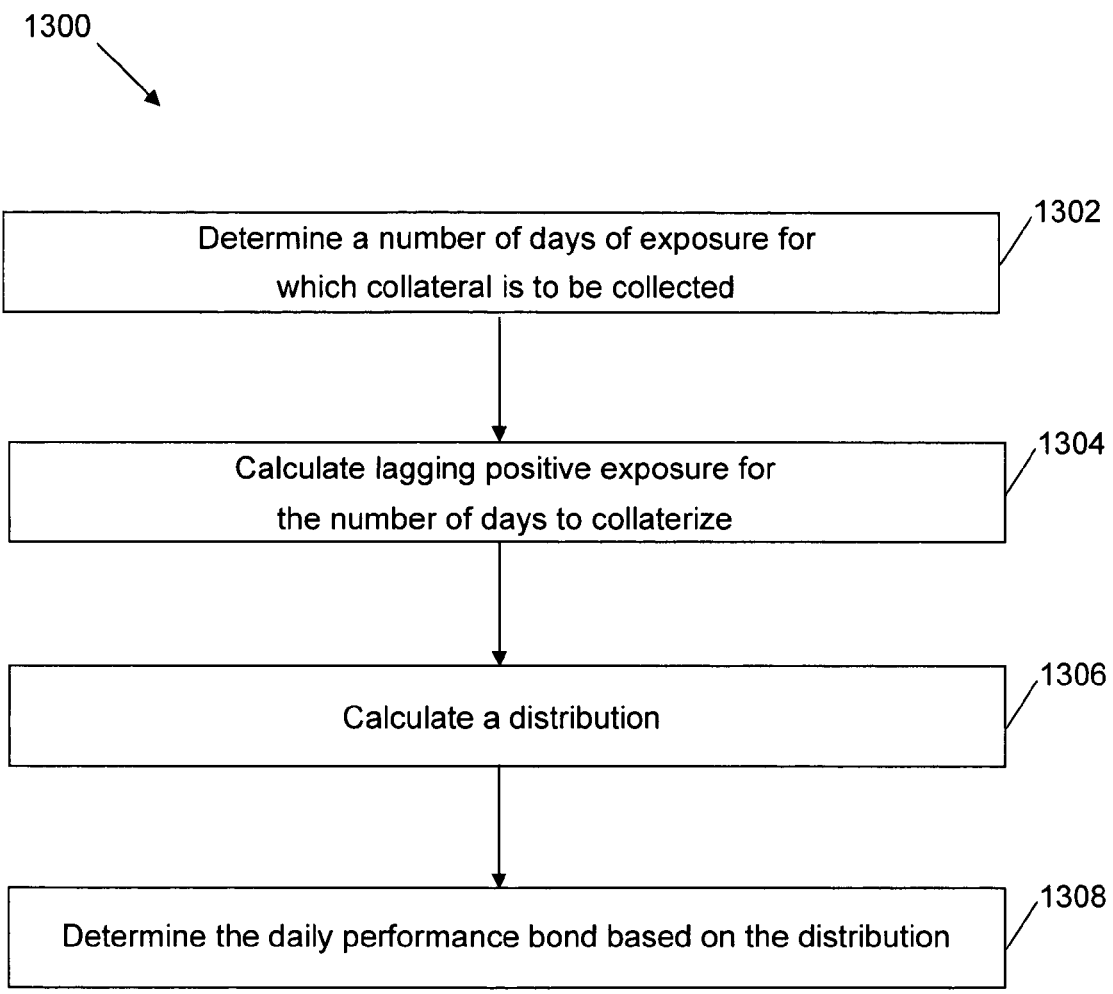
FIG. 13 is a flow chart of an exemplary performance bond calculation as illustrated in FIG. 9.

One methodology for performance bond calculation analyzes daily exposures of the RTO to its Participants. FIG. 13 is a flow chart 1300 of an exemplary performance bond calculation as illustrated in block 930 in FIG. 9. First, a number of days of exposure for which collateral is to be collected is determined, as shown at block 1302. Any number of days may be selected. For example, two days may be selected to collateralize, as this represents the minimum time period for which the RTO has exposure for the real-time and day-ahead markets. Alternatively, a greater number of days may be selected. For example, the exposure over a weekend may be three days, so that three days may be selected to collateralize. The exposure over a holiday weekend may be four days, so that four days may be selected to collateralize. In one embodiment, the number of days selected to collateralize is fixed. In an alternate embodiment, the number of days selected to collateralize is dynamic. For example, the number of days selected may depend on the day of the week, with two days selected for Monday through Thursday, three days selected for Fridays of a non-holiday weekend, and four days selected for Fridays of a holiday weekend.

Second, the lagging positive exposure for the number of days to collaterize may be calculated, as shown at block 1304. Positive exposure occurs when the participant owes the RTO. Negative exposures, wherein the RTO owes the participant, may be ignored. In the instance of two days to collateralize, the last two day's positive exposure may be calculated by adding the last two-day's positive exposure. Moreover, to obtain a greater number of data points, the positive exposure may be calculated for previous trading days. In the example of collateralizing for two days exposure, the positive exposures for the present trading day (Exposure$_{t=x}$) may be calculated by adding the positive trading for the two previous trading days (Positive_trading$_{t=x-1}$+Positive_trading$_{t=x-2}$). In addition, previous positive exposures may be analyzed, such as the exposure for the previous trading day (Exposure$_{t=x-1}$=Positive_trading$_{t=x-2}$+Positive_trading$_{t=x-3}$). Moreover, any combination of previous exposures may be analyzed. For example, the two day exposure for the current trading day and previous four days may be calculated as the following:

$$\text{Exposure}_{t=x}=\text{Positive\_trading}_{t=x-1}+\text{Positive\_trading}_{t=x-2};$$

$$\text{Exposure}_{t=x-1}=\text{Positive\_trading}_{t=x-2}+\text{Positive\_trading}_{t=x-3};$$

$$\text{Exposure}_{t=x-2}=\text{Positive\_trading}_{t=x-3}+\text{Positive\_trading}_{t=x-4};$$

$$\text{Exposure}_{t=x-3}=\text{Positive\_trading}_{t=x-4}+\text{Positive\_trading}_{t=x-5};$$

$$\text{Exposure}_{t=x-4}=\text{Positive\_trading}_{t=x-5}+\text{Positive\_trading}_{t=x-6};$$

Based on the data point or points for the exposures, a distribution may be calculated, as shown at block 1306. The mean of the distribution may be the average of a given number of lagged day's exposures. In the example above, the five days exposure may be averaged to calculate the mean. This in effect assumes that the best predictor of a given day's exposure is the positive exposures of the days immediately proceeding. The number of lagged days used in the calculation will have its biggest impact on the volatility of the resulting performance bond amounts. A longer time period may produce "smoother" results, and therefore less variation in margin. Moreover, a standard deviation may be calculated from the data points. The calculated distribution may be an assumed distribution of potential exposures.

The daily performance bond may be computed based on the distribution, as shown at block 1308. The performance bond may be a predetermined percentile exposure of the distribution. For example, the 99$^{th}$ percentile exposure of the distribution of potential exposures may be selected for the daily performance bond. Lower or higher percentile exposure may be chosen for the performance bond.

There are several distributions which may be used including a normal distribution and a Student's T-distribution. The Student's T-distribution is similar to a normal distribution but can have a variable sample standard deviation. As a result of the variance, the Student's T-distribution is relatively wider than a normal distribution. The y % confidence interval for the Student's T depends on the degrees of freedom r=(n−1), where n is the sample size. For a lag period of five days (r=4), the factor is 3.7469.

The following is an example of a performance bond calculation:

| Two-day exposure | |
|---|---|
| Day 1 | $ 477,516 |
| Day 2 | $1,377,372 |
| Day 3 | $1,595,599 |

-continued

Two-day exposure

| Day 4 | $ 798,306 |
| Day 5 | $ 589,550 |
| Average | $ 967,669 |
| Std. Deviation * 3.7469 | $1,848,992 |
| Sum = Performance Bond | $2,816,660 |

In the example given above, a participant with the indicated series of lagging two-day exposures may be required to post performance bond of $2.8 million on the day in question. While the example above was directed to calculating a performance bond for trading with a single RTO, the methodology described above may be used to calculate a performance bond for trading with multiple RTOs. Specifically, the lagging positive exposure for the number of days of exposure (two days in the example above) may be calculated for each RTO with which the Participant trades.

Further, the Spot Market Clearing House may validate and/or revise the performance bond for one, some, or all of the participants, as shown at block 1028. This validation/revision process may be performed periodically in order to determine if the defined levels of performance bond provide sufficient coverage. If coverage levels for a participant are not sufficient, new bond requirements may be defined.

Referring back to FIG. 9, Banking functionality is discussed with regard to blocks 932 to 940. The Spot Market Clearing House may manage the banking or fund transfer, as shown at block 932. The Spot Market Clearing House may perform the processes of banking by sending a clearing statement to each Clearing Member, as shown at block 936. The Clearing Member may then pay to or receive funds from the Spot Market Clearing House, as shown at block 934. This facilitates the movement of funds between the Spot Market Clearing House and its Clearing Members based upon settlement and performance bond balances. For example, if the Clearing Member pays funds to the Spot Market Clearing House, the Spot Market Clearing House may record the receipt of the funds. If the Spot Market Clearing House is to pay funds to the Clearing Member, the Spot Market Clearing House may record the payment of funds.

The Clearing Member may perform similar processes of funds movement with its customers (market participants) based on settlement and performance bond balances. Specifically, depending on whether the Clearing Member owes money or is owed money, the Clearing Member pays to or receives funds from the Participant, as shown at block 938. Similarly, depending on whether the Participant owes money or is owed money, the Participant pays to or receives funds from the Clearing Member, as shown at block 940. The Clearing Member may further have the option to increase the amount of performance bond required by the Spot Market Clearing House.

Figure 14A:
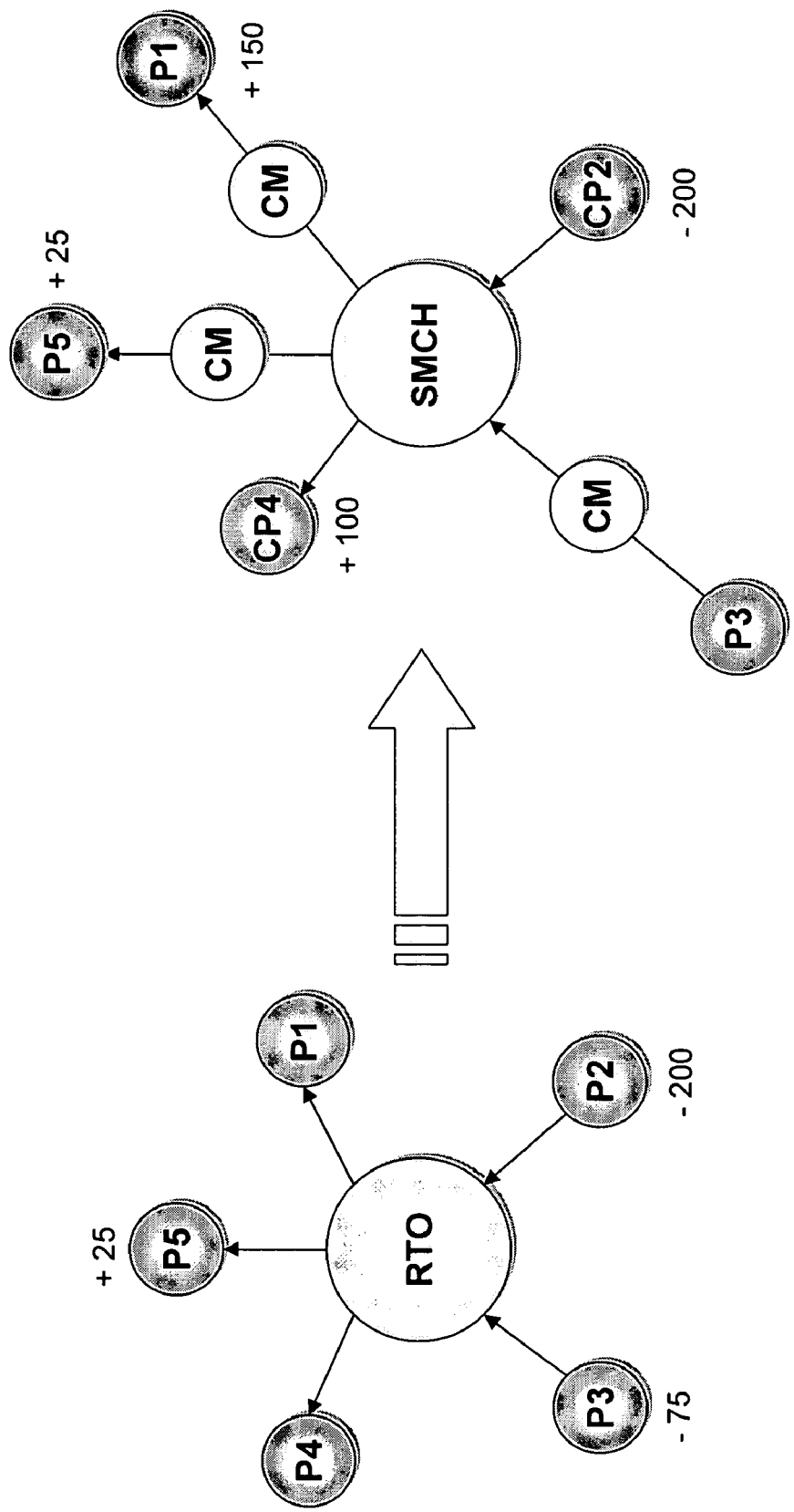
FIG. 14a is a block diagram of payments to/from Participants, with the RTO socialized risk pool and with a spot market clearing house.
Figure 14B:
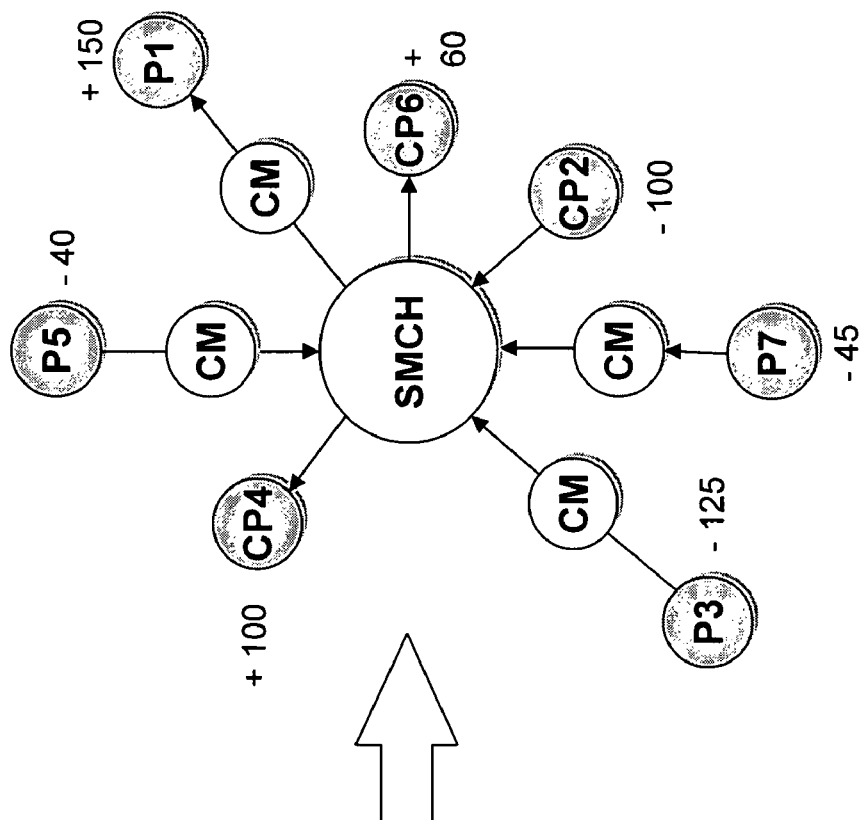
FIG. 14b is a block diagram of payments to/from Participants trading in multiple RTOs, with the RTOs socialized risk pool and with a spot market clearing house.
Figure 14B:
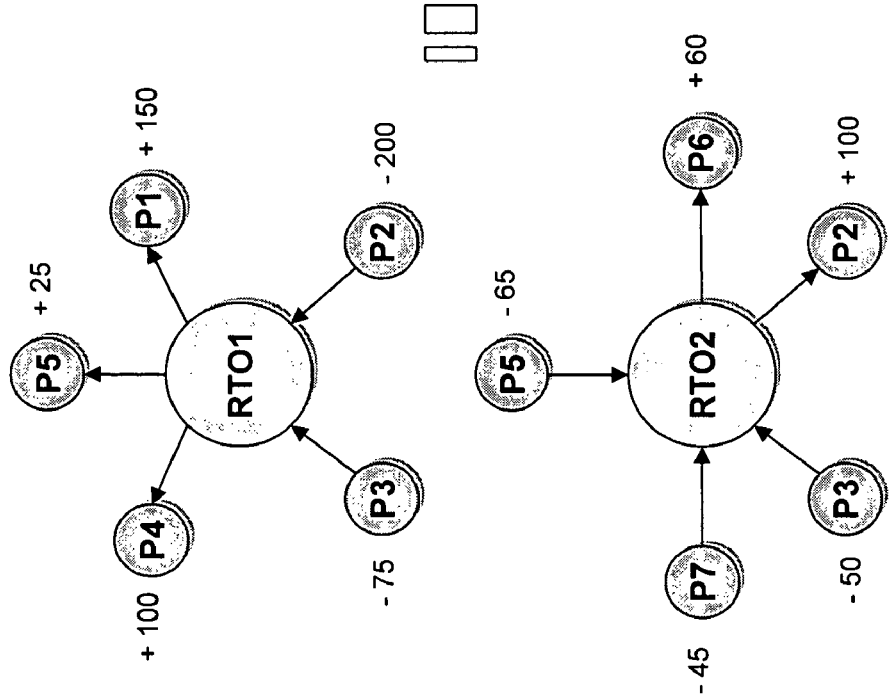
Figure 14C:
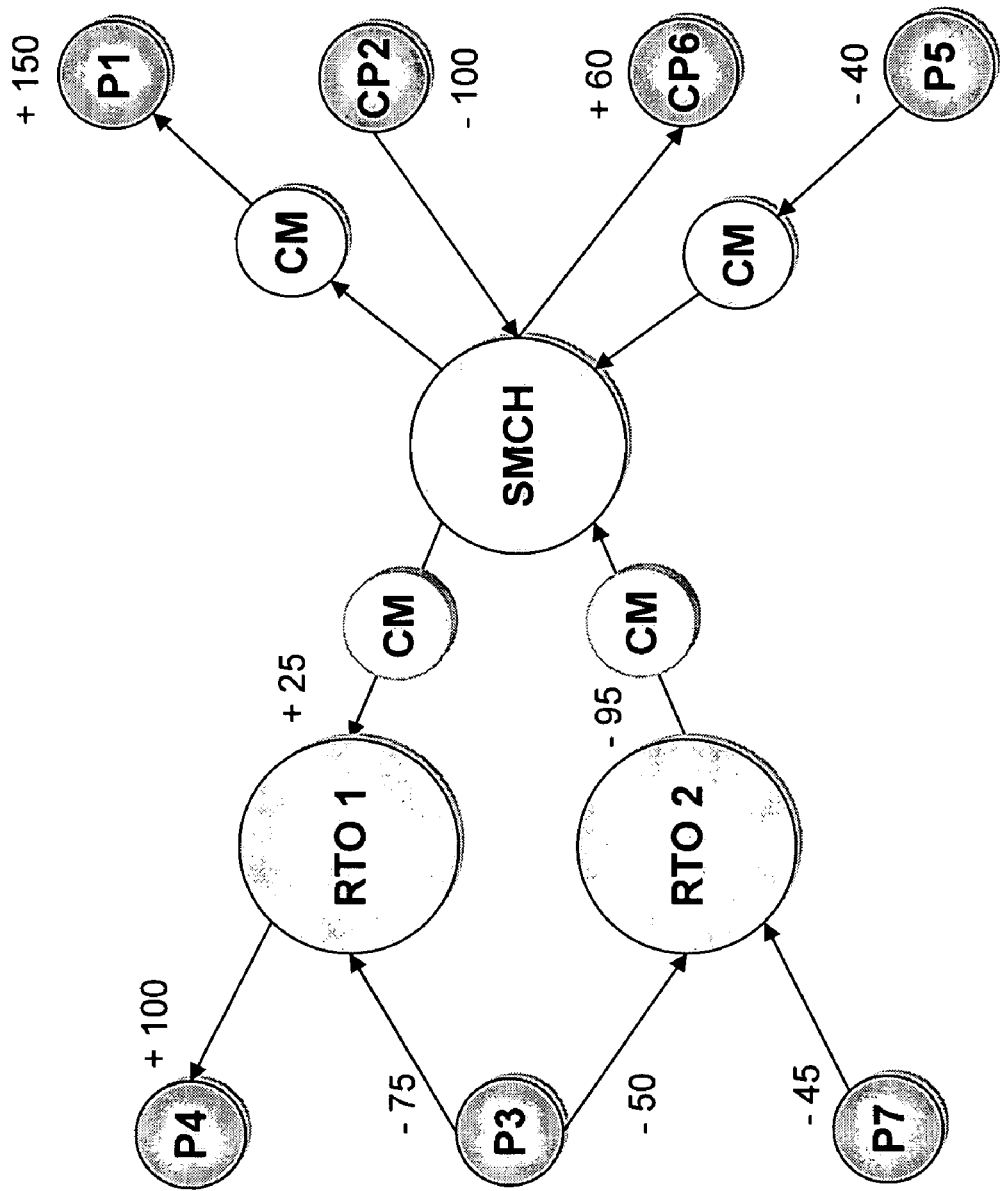
FIG. 14c is a block diagram illustrating payments to/from Participants with some Participants using spot market clearing, and other Participants using the RTO's socialized risk pool.

FIG. 14a is a block diagram of an example of payments of Participants using a Spot Market Clearing House and Clearing Members. The Spot Market Clearing House receives settlement data from a single RTO. FIG. 14b is a block diagram similar to that in FIG. 14a, but using an example in which the Spot Market Clearing House receives settlement data from two RTOs, RTO 1 and RTO 2, as depicted by the arrow in FIG. 14b. The settlement data allows the Spot Market Clearing House to pay to or receive funds from the Clearing Members, which in turn pay to or receive funds from the Participants. If a participant has sufficient financial standing, it may elect to become its own clearing member, depicted by Clearing Participant (CP). As shown in FIG. 14b, each of the Participants has a Clearing Member or is a Clearing Member. This represents the case where the RTO mandates that each Participant take part in the Spot Market Clearing House. When the RTO requires that all participants in its market take part in the Spot Market Clearing, this ensures that credit protection is uniform across all participants, and allows the RTO to get out of the credit business.

Where election is voluntary, Participants may elect to take part in the Spot Market Clearing, or remain in their RTO's Socialized Risk Pool, which the RTO would continue to operate. Any default in the Socialized Risk Pool would be socialized amongst the reduced number of participants remaining in that pool. In order to ensure that buy and sell positions are balanced, the RTO may post performance bond, and pay/receive settlement amounts, based upon the Socialized Risk Pool's net exposure. An example of this hybrid system is disclosed in FIG. 14c, which is a block diagram of an example of payments of Participants using a spot market clearing house, clearing members, and RTOs.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

The invention claimed is:

1. In a plurality of spot markets, each with at least one spot market operator that executes trades for participants trading a commodity, a method for clearing spot market trades across the plurality of spot markets using at least one spot market clearing house computer processor comprising:

receiving by the at least one spot market clearing house computer processor data sent from a first spot market operator indicative of a first initial settlement amount for a first trade between a trading participant and the first spot market operator in a predetermined period and data sent from a second spot market operator indicative of a second initial settlement amount for a second trade between the trading participant and the second spot market operator, the spot market clearing house being separate from the first and second spot market operators, and the first and second spot market operators corresponding to separate spot markets;

sending an initial clearing statement from the at least one spot market clearing house computer processor to a clearing member associated with the trading participant based on the data indicative of the first and second initial settlement amounts, the clearing member being separate from the first and second spot market operators;

recording by the at least one spot market clearing house computer processor a funds transfer in accordance with the initial clearing statement;

receiving information identifying an amount of the commodity delivered in response to the first and second trades;

after recording a funds transfer and delivery of the commodity, receiving by the at least one spot market clearing house computer processor data sent from the first spot market operator indicative of a first revised settlement amount for the first trade and data sent from the second spot market operator indicative of a second revised settlement amount for the second trade, the data indicative of the first and second revised settlement amounts being based on a difference between an amount of the commodity traded in response to the first and second trades and the amount of the commodity delivered in response to the first and second trades;

generating, using the at least one spot market clearing house computer processor, a revised clearing statement based on the data indicative of the first and second revised settlement amounts;

sending the revised clearing statement from the spot market clearing house to the clearing member;

recording by the at least one spot market clearing house computer processor a funds transfer in accordance with the revised clearing statement; and determining by the at least one spot market clearing house computer processor a performance bond corresponding to the trading participant based on the first and second trades.

2. The method of claim 1, wherein the commodity comprises electricity.

3. The method of claim 2, wherein the trades comprise real-time trades.

4. The method of claim 2, wherein the trades comprise day-ahead trades.

5. The method of claim 1, wherein the predetermined period comprises one trading day.

6. The method of claim 1, wherein the data indicative of the first initial settlement amount comprises aggregated data indicating a net settlement amount for the trading participant in a first spot market associated with the first spot market operator, and wherein the data indicative of the second initial settlement amount comprises data indicating a net settlement amount for the trading participant in a second spot market associated with the second spot market operator.

7. The method of claim 1, wherein the data indicative of the first initial settlement amount relates to an executed trade;
wherein the data indicative of the first initial settlement amount is based on an estimate of an amount of commodity transferred corresponding to the executed trade; and
wherein the data indicative of the first revised settlement amount is based on a measured amount of the commodity transferred.

8. The method of claim 2, wherein the data indicative of first and second revised settlement amounts are based on power line measurements.

9. The method of claim 1, wherein receiving by the at least one spot market clearing house computer processor data sent from the first spot market operator further comprises receiving data indicative of at least one revised settlement amount for at least one trade in a period prior to the predetermined period; and
wherein the initial clearing statement is based on the data indicative of the first initial settlement amount and the revised clearing statement is based on the data indicative the at least one revised settlement amount.

10. The method of claim 9, wherein the data indicative of the first initial settlement amount and the data indicative of the at least one revised settlement amount comprises a net settlement amount, the net settlement amount comprising a single number that the trading participant owes to or is owed from the first spot market operator.

11. In an electricity spot market with a plurality of spot market operators corresponding to a plurality of separate spot markets, the spot market operators executing trades for participants trading electricity and generating data indicative of settlement amounts for the trades in a predetermined period, a method for clearing spot market trades across the plurality of separate spot markets using at least one spot market clearing house computer processor comprising:

receiving by the at least one spot market clearing house computer processor data indicative of settlement amounts for the trades of a participant in the predetermined period from the plurality of spot market operators, the plurality of spot market operators being separate from the spot market clearing house;

aggregating by the at least one spot market clearing house computer processor the data indicative of settlement amounts for the trades from the plurality of spot market operators to indicate a net settlement amount for the participant across the plurality of separate spot markets;

determining by the at least one spot market clearing house computer processor a performance bond for the participant based on the trades of the participant across the plurality of separate spot markets conducted through the corresponding spot market operators;

sending a clearing statement from the at least one spot market clearing house computer processor to at least one clearing member based on the aggregated settlement amounts and the performance bond;

recording by the at least one spot market clearing house computer processor a funds transfer in accordance with the clearing statement;

receiving information identifying an amount of the commodity delivered in response to at least one of the trades;

receiving by the at least one spot market clearing house computer processor data indicative of at least one revised settlement amount for the at least one of the trades, the data indicative of at least one revised settlement amount for at least one of the trades being based on a difference between an amount of the commodity traded in response to the at least one of the trades and the amount of the commodity delivered in response to the at least one of the trades; and sending a revised clearing statement from the at least one spot market clearing house computer processor to the clearing member based on the data indicative of the revised settlement amount.

12. The method of claim 11, wherein the commodity comprises electricity.

13. The method of claim 12, wherein the trades comprise real-time trades.

14. The method of claim 12, wherein the trades comprise day-ahead trades.

15. The method of claim 11, wherein the predetermined period comprises one trading day.

16. The method of claim 11, wherein the settlement amounts received from the plurality of spot market operators comprise aggregated settlement amounts indicating net settlement amounts for the participant in the plurality of spot market operators.

17. The method of claim 11, wherein determining by the at least one spot market clearing house computer processor a performance bond comprises analyzing the aggregated settlement amounts.

18. The method of claim 11, wherein the spot market operator sends data indicative of initial settlement amounts for the trades in the predetermined period and sends revised settlement amounts for the trades in a period later than the predetermined period;
- wherein receiving the settlement amounts comprises receiving the data indicative of the initial settlement amounts; and
- wherein aggregating the settlement amounts comprises aggregating the data indicative of the initial settlement amounts;
- wherein sending a clearing statement is based on the data indicative of the initial settlement amounts.

19. The method of claim 11, wherein the spot market operator sends data indicative of the initial settlement amounts for the trades and sends data indicative of revised settlement amounts for the trades after recording the funds transfer;
- wherein receiving the settlement amounts comprises receiving, from the plurality of spot market operators, data indicative of initial settlement amounts for the trades of the participant in the predetermined period and data indicative of at least one revised settlement amount for a trade in a period prior to the predetermined period; and
- wherein aggregating the settlement amounts comprises aggregating the data indicative of the initial settlement amounts and the revised settlement amount;
- wherein sending a clearing statement is based on the initial settlement amounts.

20. The method of claim 11, wherein determining a performance bond comprises determining a performance bond for a current day of trading.

21. The method of claim 20, wherein determining a performance bond for a current day of trading comprises:
- determining a number of days to collateralize;
- determining positive exposures of trades for a participant with at least one spot market operator for most recent days trading equal to the number of days to collateralize; and
- statistically analyzing the determined positive exposures.

22. The method of claim 20, wherein determining position exposures of trades comprises determining position exposures of trades for a participant with multiple spot market operators.

23. In a network having a first and a second spot market operator coupled to said network, the first and second spot market operators executing trades for participants trading a commodity and sending data indicative of settlement amounts for the trades in a predetermined period, a non-transitory computer readable medium having program code stored thereon which, when executed by a computer, performs the steps of:
- receiving by a spot market clearing house data sent from a first spot market operator indicative of a first initial settlement amount for a first trade between a trading participant and the first spot market operator in a predetermined period and data sent from a second spot market operator indicative of a second initial settlement amount for a second trade between the trading participant and the second spot market operator, the spot market clearing house being separate from the first and second spot market operators, and the first and second spot market operators corresponding to separate spot markets;
- sending an initial clearing statement from the spot market clearing house to a clearing member associated with the trading participant based on the data indicative of the first and second initial settlement amounts, the clearing member being separate from the first and second spot market operators;
- recording by the spot market clearing house a funds transfer in accordance with the initial clearing statement;
- receiving by the spot market clearing house information identifying an amount of the commodity delivered in response to the first and second trades;
- after recording a funds transfer and delivery of the commodity, receiving by the spot market clearing house data sent from the first spot market operator indicative of a first revised settlement amount for the first trade and data sent from the second spot market operator indicative of a second revised settlement amount for the second trade, the data indicative of the first and second revised settlement amounts being based on a difference between an amount of the commodity traded in response to the first and second trades and the amount of the commodity delivered in response to the first and second trades;
- sending a revised clearing statement from the spot market clearing house to the clearing member based on the data indicative of the first and second revised settlement amounts; and
- recording by the spot market clearing house a funds transfer in accordance with the revised clearing statement.

24. The non-transitory computer readable medium of claim 23, wherein the commodity comprises electricity.

25. The non-transitory computer readable medium of claim 23, wherein the program code further performs the step of determining by the spot market clearing house a performance bond corresponding to the trading participant based on the first and second trades.

26. The non-transitory computer readable medium of claim 25, wherein determining a performance bond for a current day of trading comprises:
- determining a number of days to collateralize;
- determining positive exposures of trades for the trading participant with at least one spot market operator for most recent days trading equal to the number of days to collateralize; and statistically analyzing the determined positive exposures.

27. The non-transitory computer readable medium of claim 23, wherein the data indicative of the first initial settlement amount relate to an executed trade;
- wherein the data indicative of the first initial settlement amount is based on an estimate of an amount of commodity transferred corresponding to the executed trade; and
- wherein the data indicative of the first revised settlement amount is based on a measured amount of the commodity transferred.

28. In a network having a plurality of spot market operator nodes coupled to said network, the spot market operator nodes executing trades for participants trading a commodity and sending data indicative of settlement amounts for the trades in a predetermined period across a plurality of separate spot markets corresponding to the plurality of spot market operator nodes, a non-transitory computer readable medium having program code stored thereon which, when executed by a computer, performs the steps of:

receiving by the spot market clearing house data indicative of settlement amounts for the trades of a participant in the predetermined period from the plurality of spot market operators, the plurality of spot market operators being separate from the spot market clearing house;

aggregating the data indicative of settlement amounts for the trades from the plurality of spot market operators to indicate a net settlement amount for the participant across the plurality of separate spot markets;

determining by the spot market clearing house a performance bond for the participant based on the trades of the participant across the plurality of separate spot markets conducted through the corresponding spot market operators;

sending a clearing statement from the spot market clearing house to at least one clearing member based on the aggregated settlement amounts and the performance bond;

recording by the spot market clearing house a funds transfer in accordance with the clearing statement;

receiving information identifying an amount of the commodity delivered in response to at least one of the trades;

receiving by the at least one spot market clearing house processor data indicative of at least one revised settlement amount for the at least one of the trades, the data indicative of at least one revised settlement amount for at least one of the trades being based on a difference between an amount of the commodity traded in response to the at least one of the trades and the amount of the commodity delivered in response to the at least one of the trades; and sending a revised clearing statement from the at least one spot market clearing house processor to the clearing member based on the data indicative of the revised settlement amount.

29. The non-transitory computer readable medium of claim 28, wherein the spot market operator nodes send data indicative of initial settlement amounts for the trades in the predetermined period and send revised settlement amounts for the trades in a period later than the predetermined period;

wherein receiving the settlement amounts comprises receiving the data indicative of the initial settlement amounts;

wherein aggregating the settlement amounts comprises aggregating the data indicative of the initial settlement amounts; and wherein sending a clearing statement is based on the data indicative of the initial settlement amounts.

30. The non-transitory computer readable medium of claim 28, wherein the commodity comprises electricity.

* * * * *